(12) United States Patent
Shimizu et al.

(10) Patent No.: US 10,983,456 B2
(45) Date of Patent: Apr. 20, 2021

(54) DEVELOPER CARTRIDGE PROVIDED WITH GEAR HAVING ENGAGEMENT PORTIONS

(71) Applicant: BROTHER KOGYO KABUSHIKI KAISHA, Nagoya (JP)

(72) Inventors: Keita Shimizu, Nagoya (JP); Takashi Shimizu, Nagoya (JP); Hideshi Nishiyama, Owariasahi (JP); Naoya Kamimura, Ichinomiya (JP); Tomonori Watanabe, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/517,901

(22) Filed: Jul. 22, 2019

(65) Prior Publication Data

US 2019/0339632 A1    Nov. 7, 2019

Related U.S. Application Data

(63) Continuation of application No. 15/915,294, filed on Mar. 8, 2018, now Pat. No. 10,365,582, which is a
(Continued)

(30) Foreign Application Priority Data

Oct. 2, 2015    (JP) ................................. 2015-197202

(51) Int. Cl.
*G03G 15/08*    (2006.01)
*G03G 21/18*    (2006.01)
(Continued)

(52) U.S. Cl.
CPC ..... *G03G 15/0865* (2013.01); *G03G 15/0806* (2013.01); *G03G 15/0863* (2013.01);
(Continued)

(58) Field of Classification Search
CPC ........... G03G 15/0865; G03G 15/0867; G03G 15/0872; G03G 15/0886; G03G 21/1676
(Continued)

(56) References Cited

U.S. PATENT DOCUMENTS

2006/0193646 A1    8/2006    Suzuki et al.
2011/0243578 A1    10/2011    Ukai et al.
(Continued)

FOREIGN PATENT DOCUMENTS

CN    201364466 Y    12/2009
CN    201402371 Y    2/2010
(Continued)

OTHER PUBLICATIONS

Grant of Patent issued in corresponding Korean Patent Application No. 10-2018-7012268, dated Sep. 26, 2019.
(Continued)

*Primary Examiner* — Walter L Lindsay, Jr.
(74) *Attorney, Agent, or Firm* — Merchant & Gould P.C.

(57) ABSTRACT

A developer cartridge may include: a first gear having a small-diameter gear portion and a large-diameter gear portion; and a second gear including: a first columnar portion centered on a second axis; a second columnar portion having a smaller diameter than the first columnar portion; a first engagement portion extending along a portion of a peripheral surface of the first columnar portion and engageable with the small-diameter gear portion; a second engagement portion extending along a portion of a peripheral surface of the second columnar portion and positioned closer to a housing than the first engagement portion in an axial direction and engageable with the large-diameter gear portion; and a protruding portion protruding in the axial direction and rotatable together with the first engagement portion and the second engagement portion. The second engagement portion
(Continued)

may engage the large-diameter gear portion after the first engagement portion engages the small-diameter gear portion.

15 Claims, 27 Drawing Sheets

Related U.S. Application Data continuation of application No. 15/407,857, filed on Jan. 17, 2017, now Pat. No. 9,952,535, which is a continuation of application No. PCT/JP2015/080812, filed on Oct. 30, 2015.

(51) Int. Cl.
  *G03G 21/16* (2006.01)
  *F16H 27/04* (2006.01)

(52) U.S. Cl.
  CPC ..... *G03G 15/0891* (2013.01); *G03G 15/0896* (2013.01); *G03G 21/1647* (2013.01); *G03G 21/186* (2013.01); *F16H 27/04* (2013.01); *G03G 2221/1657* (2013.01)

(58) Field of Classification Search
  USPC .......................................................... 399/326
  See application file for complete search history.

(56) References Cited

U.S. PATENT DOCUMENTS

| | | |
|---|---|---|
| 2012/0243882 A1 | 9/2012 | Carot |
| 2013/0051814 A1 | 2/2013 | Itabashi et al. |
| 2013/0170845 A1 | 7/2013 | Itabashi |
| 2014/0186058 A1 | 7/2014 | Shimizu |
| 2015/0003868 A1 | 1/2015 | Shimizu et al. |
| 2015/0033888 A1 | 2/2015 | Kuroda et al. |
| 2015/0212475 A1 | 7/2015 | Ueno |
| 2015/0227081 A1 | 8/2015 | Takagi |
| 2015/0277355 A1 | 10/2015 | Taguchi |
| 2017/0123346 A1 | 5/2017 | Shimizu et al. |
| 2017/0123347 A1 | 5/2017 | Shimizu |

FOREIGN PATENT DOCUMENTS

| | | |
|---|---|---|
| CN | 202351613 U | 7/2012 |
| CN | 202421742 U | 9/2012 |
| CN | 202975597 U | 6/2013 |
| CN | 203101817 U | 7/2013 |
| CN | 203299518 U | 11/2013 |
| CN | 103513555 A | 1/2014 |
| CN | 103713496 A | 4/2014 |
| CN | 104423207 A | 3/2015 |
| CN | 204347444 U | 5/2015 |
| CN | 104749926 A | 7/2015 |
| CN | 204479913 U | 7/2015 |
| CN | 106817911 A | 6/2017 |
| DE | 10 2015 104 736 A1 | 10/2015 |
| JP | 54-22230 A | 2/1979 |
| JP | 4348632 B2 | 10/2009 |
| JP | 2012-194318 A | 10/2012 |
| JP | 2014-106442 A | 6/2014 |
| JP | 2014-130183 A | 7/2014 |
| JP | 2015-11231 A | 1/2015 |
| JP | 2015-87628 A | 5/2015 |

OTHER PUBLICATIONS

International Search Report and Written Opinion issued in international application PCT/JP2015/080812, dated Dec. 22, 2015.
International Search Report and Written Opinion issued in International Patent Application No. PCT/JP2015/080813, dated Dec. 15, 2015.
Extended European Search Report issued in European Patent Application No. 15899117.4, dated Jun. 30, 2017.
Extended European Search Report issued in European Patent Application No. 15899116.6, dated Jul. 31, 2017.
Office Action issued in related U.S. Appl. No. 15/407,961, dated Nov. 27, 2017.
Office Action issued in related Japanese Patent Application No. 2015-197202, dated May 21, 2019.
Office Action issued in related Chinese Patent Application No. 201580043746.3, dated Aug. 15, 2018.
International Preliminary Report on Patentability issued in related International Patent Application No. PCT/JP2015/080813, dated May 11, 2018.
International Preliminary Report on Patentability issued in related International Patent Application No. PCT/JP2015/080812, dated Apr. 12, 2018.
Extended European Search Report issued in related European Patent Application No. 17191064.9, dated Feb. 5, 2018.
Office Action (Examination Report) issued in corresponding India Patent Application No. 201817014024, dated Feb. 25, 2020.
Notification of First Office Action issued in related Chinese Patent Application No. 201580043742.5, dated Apr. 20, 2020.
Office Action for corresponding BR Application No. 112018004586-1 dated May 19, 2020 (translation included), 9 pages.
Office Action issued in corresponding German Patent Application No. 112015003314.9, dated Feb. 11, 2020.
Notification of Second Office Action issued in related Chinese Patent Application No. 201580043742.5, dated Oct. 28, 2020.

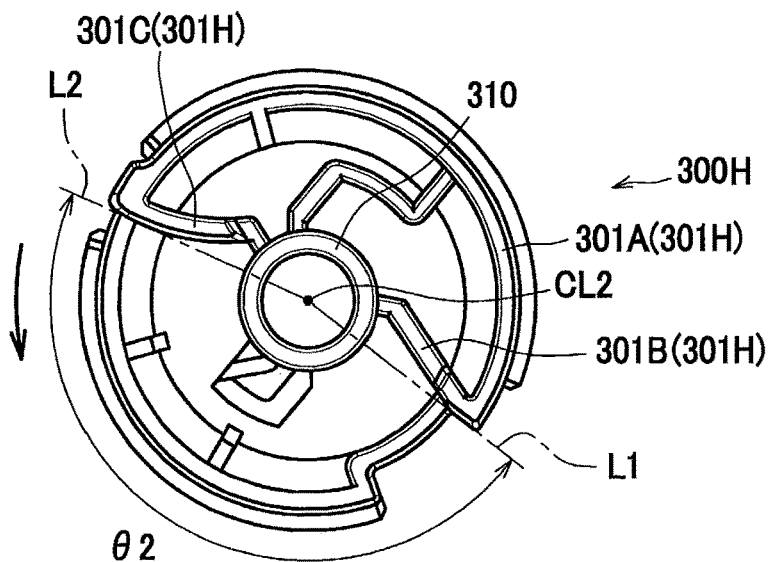
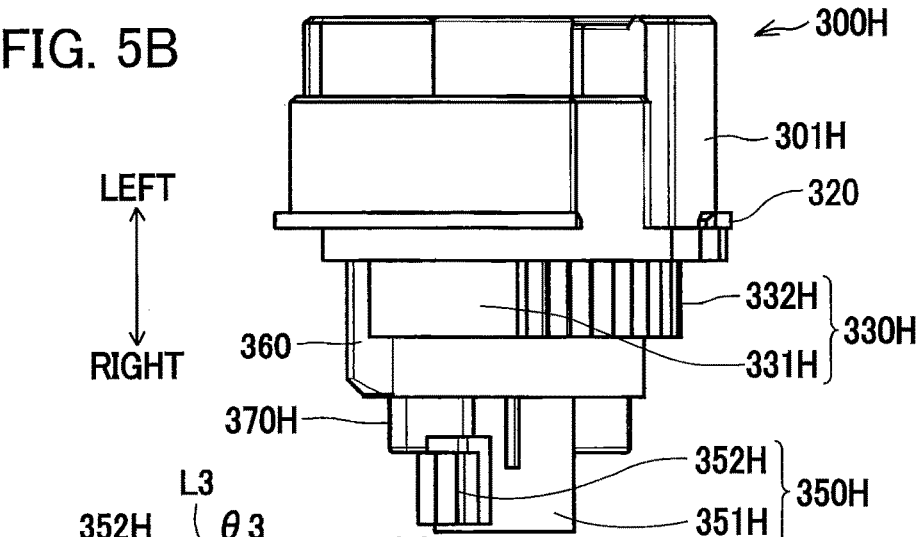
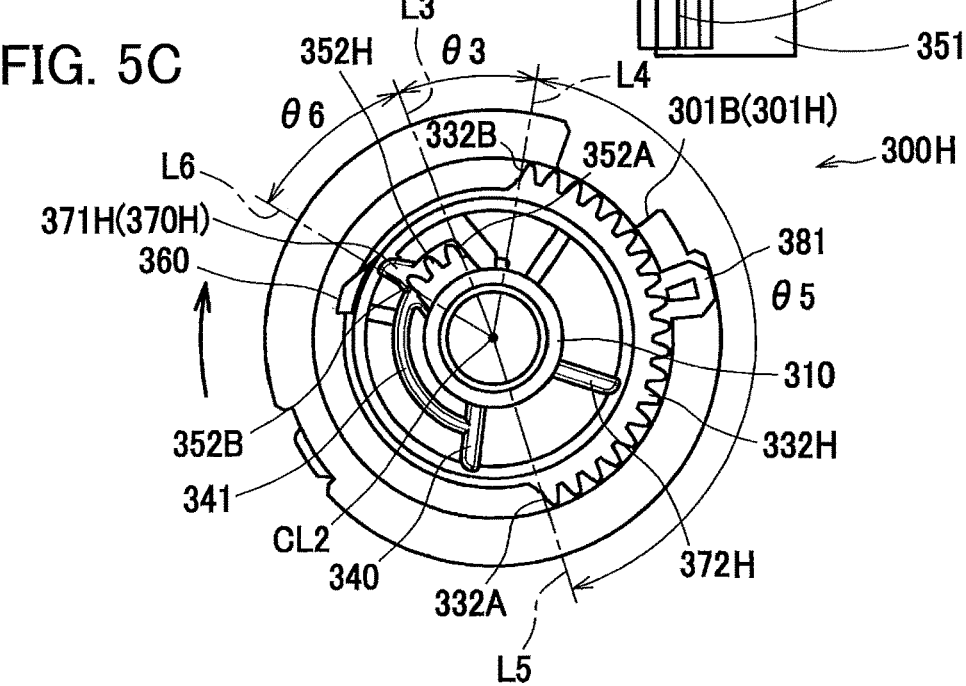

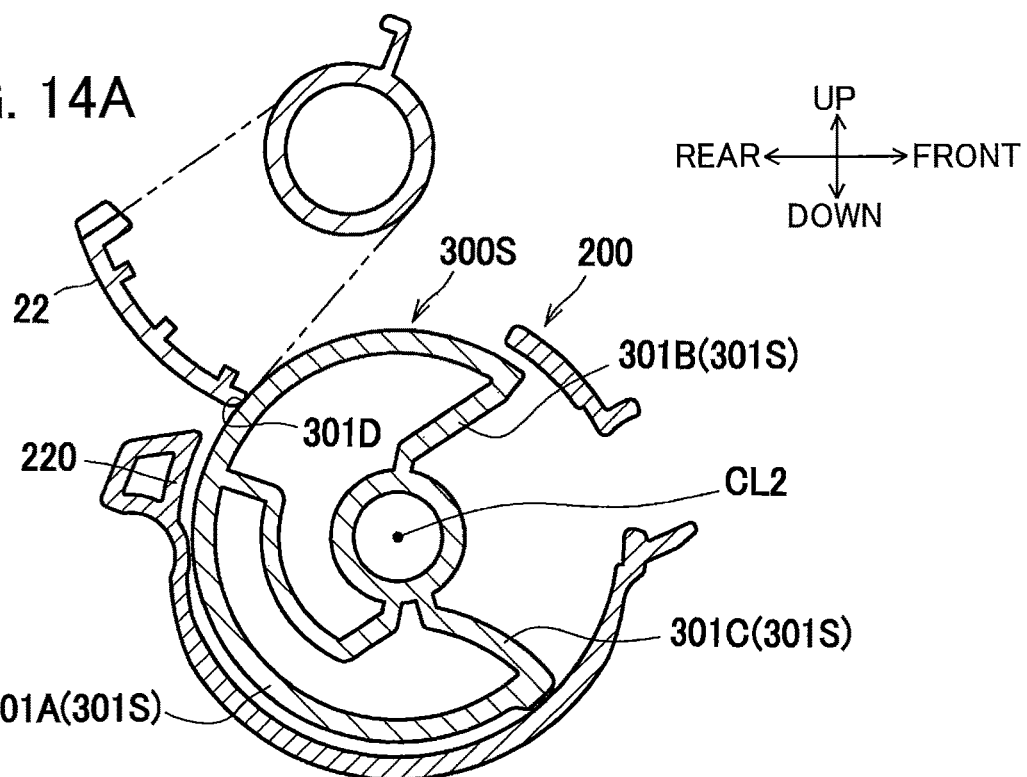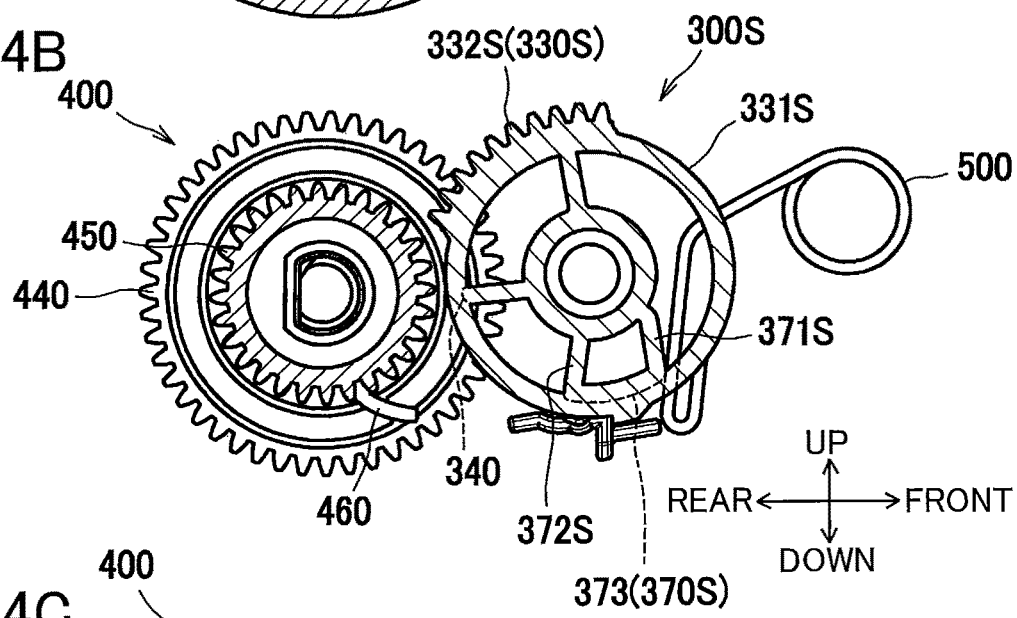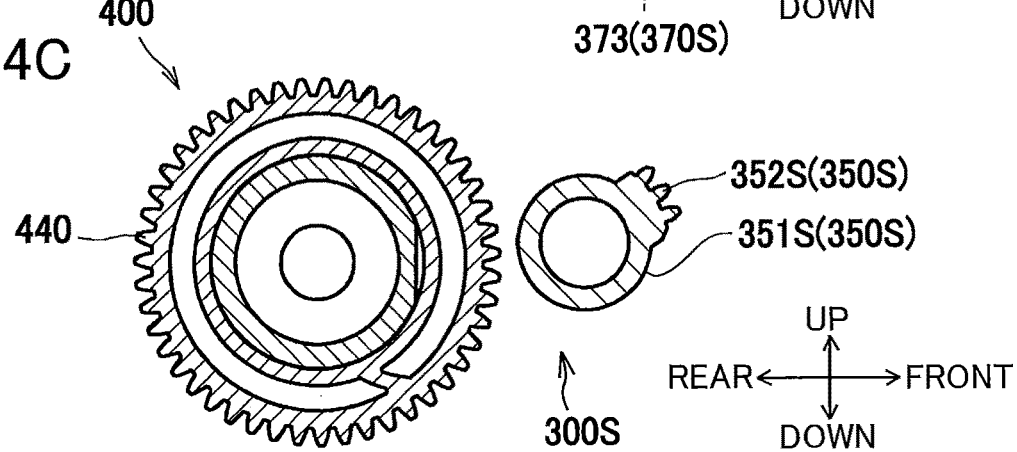

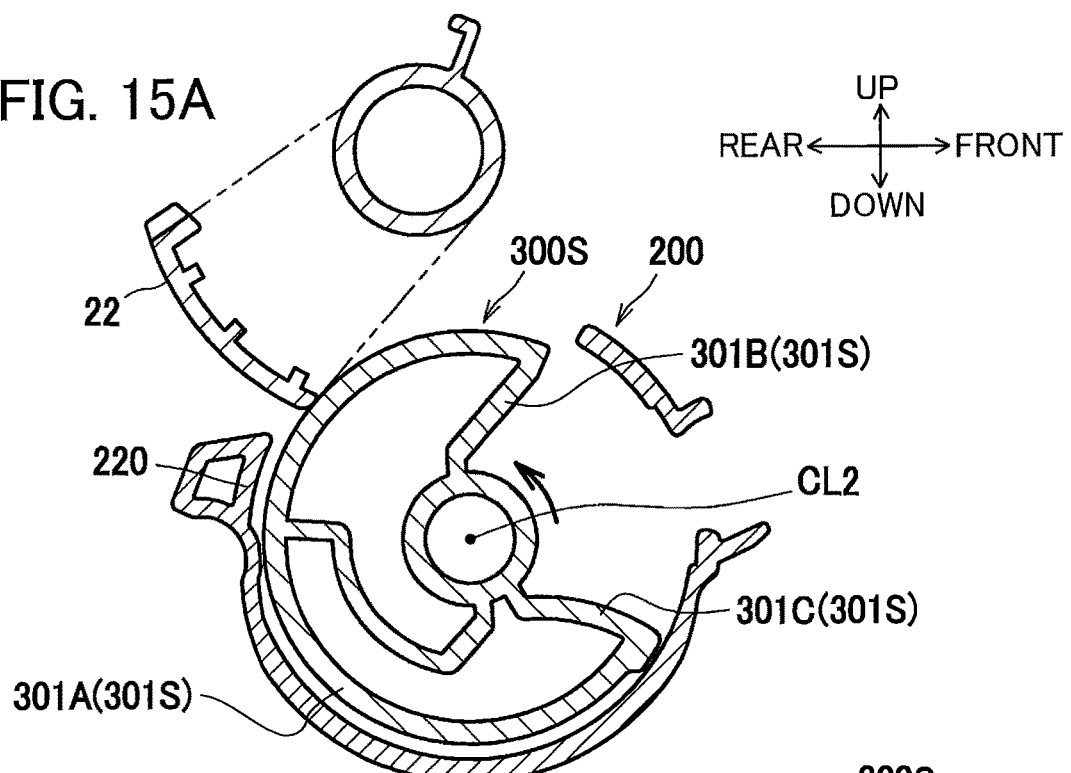
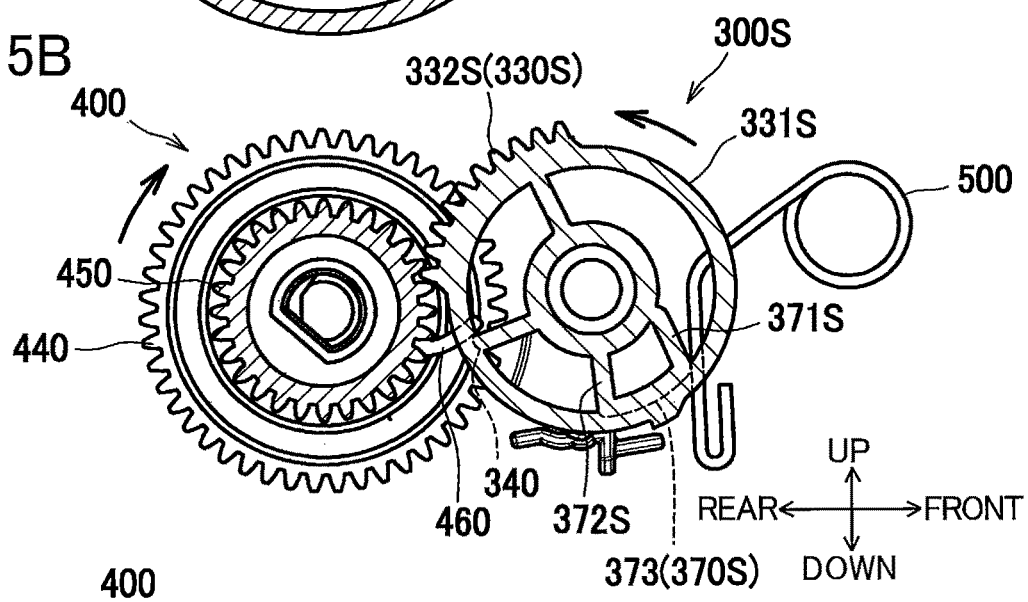
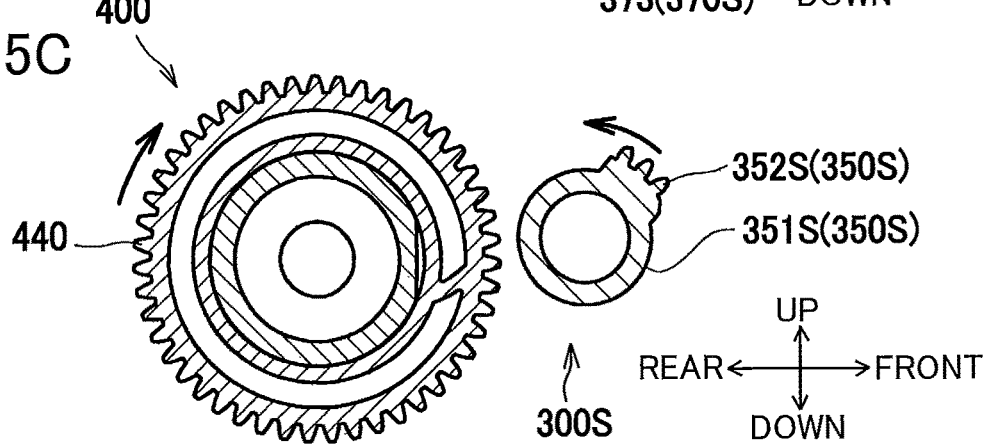

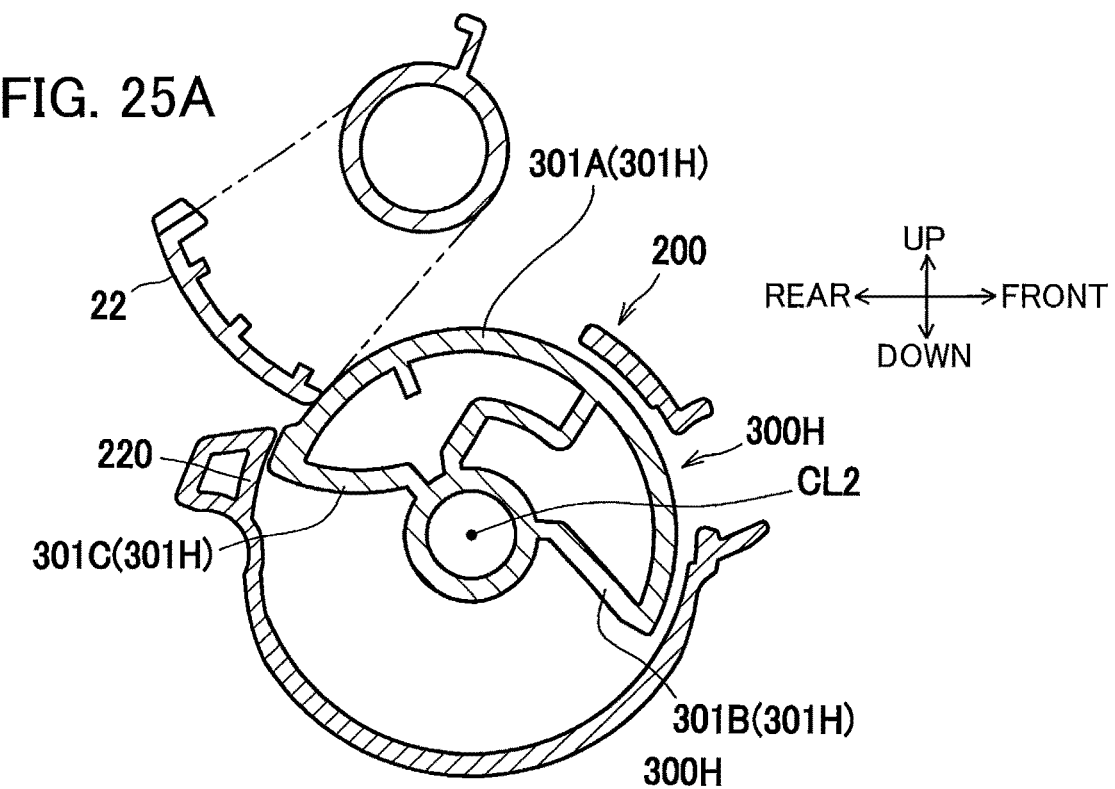
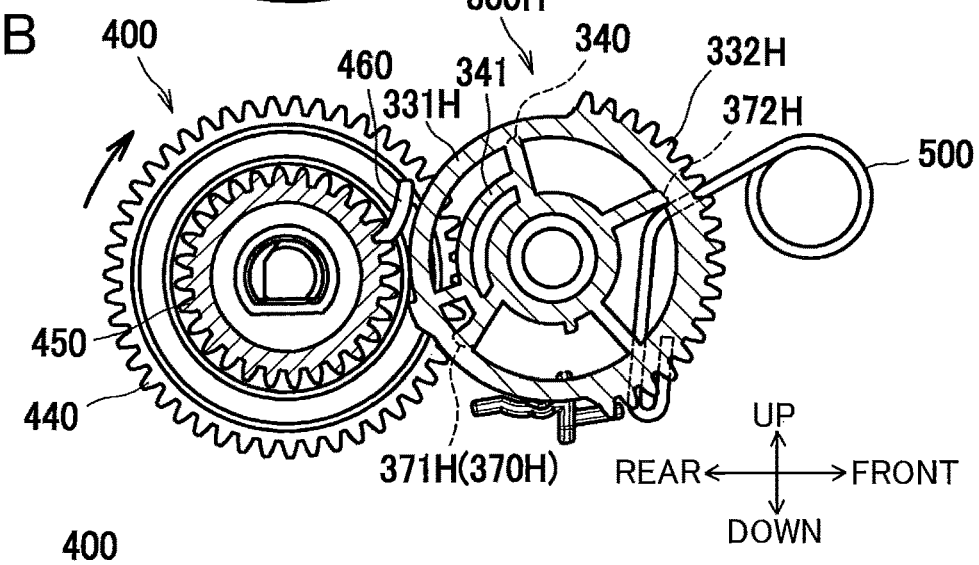
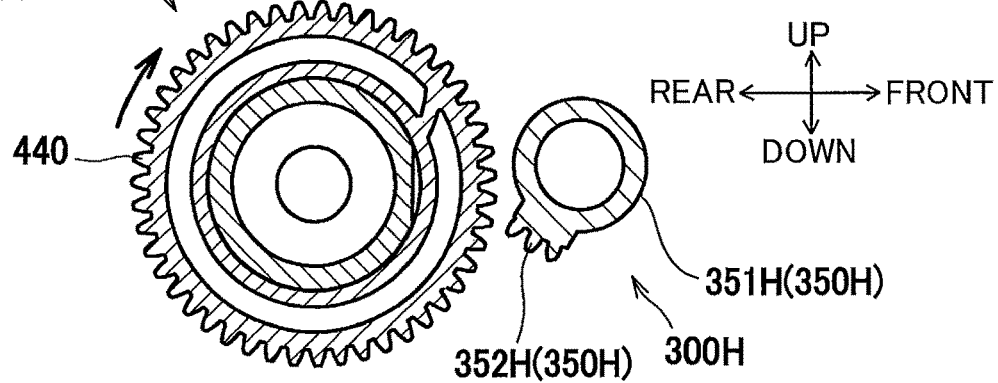

DEVELOPER CARTRIDGE PROVIDED WITH GEAR HAVING ENGAGEMENT PORTIONS

CROSS REFERENCE TO RELATED APPLICATION

This is a continuation of U.S. patent application Ser. No. 15/915,294, filed Mar. 8, 2018, which is a continuation of U.S. patent application Ser. No. 15/407,857, filed Jan. 17, 2017, which is a continuation of International Application No. PCT/JP2015/080812 filed on Oct. 30, 2015 which claims priority from Japanese Patent Application No. 2015-197202 filed Oct. 2, 2015. The entire contents of the earlier applications are incorporated herein by reference.

TECHNICAL FIELD

The present disclosure relates to a developer cartridge that accommodates developer therein.

BACKGROUND

Conventionally, there is known in the art a developer cartridge including a detection protrusion that can be in contact with an actuator provided at a housing of an image-forming apparatus, and a detection gear including the detection protrusion (for example, refer to Japanese Patent Publication No. 4848632). Specifically, in this art, the detection protrusion pushes the actuator when the developer cartridge is attached to the image-forming apparatus, and when a drive force is input to the cartridge thereafter, rotation of the detection gear causes the detection protrusion to push the actuator further and then to move away from the actuator. Further, in this art, the number of detection protrusions varies according to the specification of the developer cartridge. With this structure, how many times the actuator is pushed by the detection protrusion(s) is configured to be detected by a control device, thereby allowing the control device to determine the specification of the developer cartridge.

SUMMARY

The inventors of the present application have devised an unprecedented novel detection gear.

Accordingly, it is an object of the present disclosure to provide a developer cartridge provided with a detection gear having a new configuration.

In order to attain the above object, a developer cartridge according to an aspect of the disclosure may include: a housing configured to accommodate developer therein; a first gear rotatable about a first axis extending in an axial direction; and a second gear rotatable about a second axis extending in the axial direction. The first gear may include a small-diameter gear portion and a large-diameter gear portion having a diameter larger than a diameter of the small-diameter gear portion. The second gear may include: a first columnar portion extending in the axial direction and centered on the second axis; a second columnar portion extending in the axial direction and centered on the second axis, the second columnar portion having a diameter smaller than a diameter of the first columnar portion; a first engagement portion extending along a portion of a peripheral surface of the first columnar portion, the first engagement portion being engageable with the small-diameter gear portion; a second engagement portion extending along a portion of a peripheral surface of the second columnar portion, the second engagement portion being positioned closer to the housing than the first engagement portion to the housing in the axial direction, the second engagement portion being engageable with the large-diameter gear portion; and a protruding portion protruding in the axial direction and rotatable together with the first engagement portion and the second engagement portion. The second engagement portion may be configured to engage the large-diameter gear portion after the first engagement portion is engaged with the small-diameter gear portion.

Further, a developer cartridge according to another aspect of the present disclosure may include: a housing configured to accommodate developer therein; a first gear rotatable about a first axis extending in an axial direction; and a second gear rotatable about a second axis extending in the axial direction. The first gear may include a small-diameter gear portion and a large-diameter gear portion having a diameter larger than a diameter of the small-diameter gear portion. The second gear may include: a first engagement portion extending along a portion of a peripheral surface of the second gear, the first engagement portion being engageable with the small-diameter gear portion; a second engagement portion positioned closer to the housing than the first engagement portion to the housing in the axial direction, the second engagement portion extending along a portion of the peripheral surface of the second gear and being arranged at a different position from the first engagement portion in a rotation direction of the second gear, the second engagement portion being engageable with the large-diameter gear portion after the first engagement portion engages the small-diameter gear portion; and a protruding portion protruding in the axial direction and rotatable together with the first engagement portion and the second engagement portion. A rotational locus defined by rotation of the second engagement portion may be smaller than a rotational locus defined by rotation of the first engagement portion.

With each of the above-described structures, the detection gear may be rotatable while the small-diameter gear portion and the first engagement portion are intermeshed and while the large-diameter gear portion and the second engagement portion are intermeshed. Accordingly, when compared to a configuration where the second engagement portion is not provided, for example, amount of rotation of the detection gear can be increased, which leads to increase in an amount of movement of the protruding portion, thereby allowing new product detection and specification detection to be performed reliably.

According to the present disclosure, there can be provided a developer cartridge provided with a detection gear having a novel structure.

BRIEF DESCRIPTION OF THE DRAWINGS

In the drawings:

FIG. 5A is a left side view of a high-capacity type detection gear of the high-capacity type developing cartridge according to the embodiment;

FIG. 5B is a top plan view of the high-capacity type detection gear;

FIG. 5C is a right side view of the high-capacity type detection gear;

FIGS. 14A through 14C are cross-sectional views illustrating states of various components when the standard-type detection gear is at the initial position;

FIGS. 15A through 15C are cross-sectional views illustrating states of various components when a first gear portion of the standard-type detection gear is intermeshed with a small-diameter gear portion of the transmission gear;

FIGS. 25A through 25C are cross-sectional views illustrating states of various components when the high-capacity type detection gear is at the final position;

DETAILED DESCRIPTION

Figure 1:
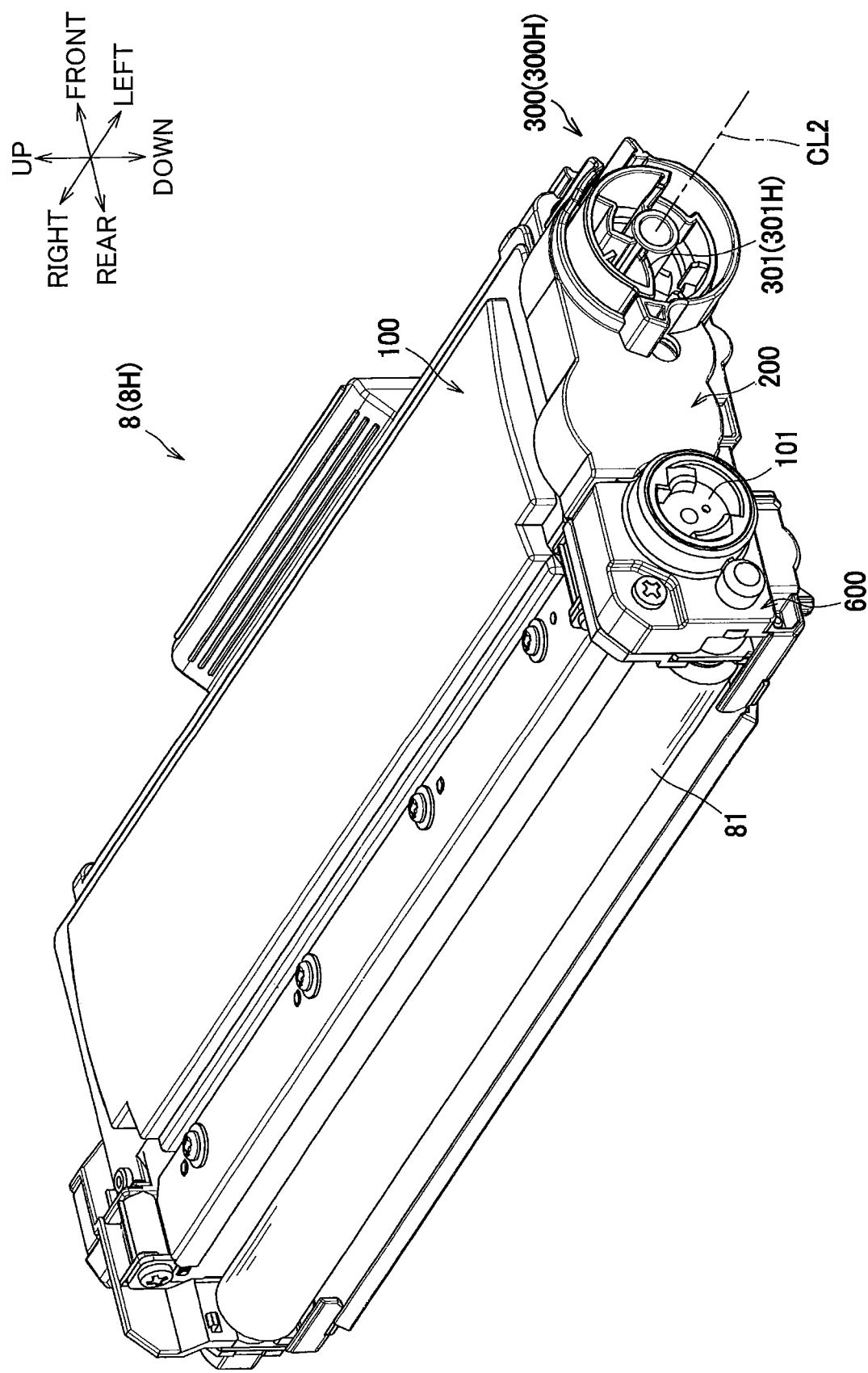
FIG. 1 is a perspective view of a developing cartridge (high-capacity-type) according to an embodiment of the present disclosure.

Next, a detailed structure of a developing cartridge 8 according to an embodiment of the present disclosure will be described. In the following description, directions are based on the directions indicated in FIG. 3A. That is, in FIG. 3A, the right side will be called "front side," and the left side will be called "rear side," the far side in the direction perpendicular to the plane of FIG. 3A will be recalled "right side", and the near side in the direction perpendicular to the plane of FIG. 3A will be called "left side." With regard to the up-down direction, the vertical direction in FIG. 3A will be used as "up-down direction".

It should be noted that there are two types with respect to the developing cartridge 8 according to the present embodiment: a standard type and a high-capacity type. The developing cartridge 8 of the high-capacity type can accommodate a larger amount of toner than the developing cartridge 8 of the standard type. Hereinafter, the developing cartridge 8 of the standard type may be referred to as a standard-type developing cartridge 8S, while the developing cartridge 8 of the high-capacity type may be referred to as a high-capacity-type developing cartridge 8H, whenever necessary.

Now the detailed structure of the developing cartridge 8 will be described with reference to FIGS. 1 and 2, using the high-capacity-type developing cartridge 8H as an example.

The developing cartridge 8 includes a developing roller 81, a cartridge body 100 as an example of a housing, a first gear cover 200, a second gear cover 600, and a detection protrusion 301 exposed outside through the first gear cover 200, as an example of a protruding portion. The detection protrusion 301 is provided at a detection gear 300 that is rotatable about a second axis CL2 extending in the axial direction. In the embodiment, the axial direction coincides with a left-right direction.

Figure 2:
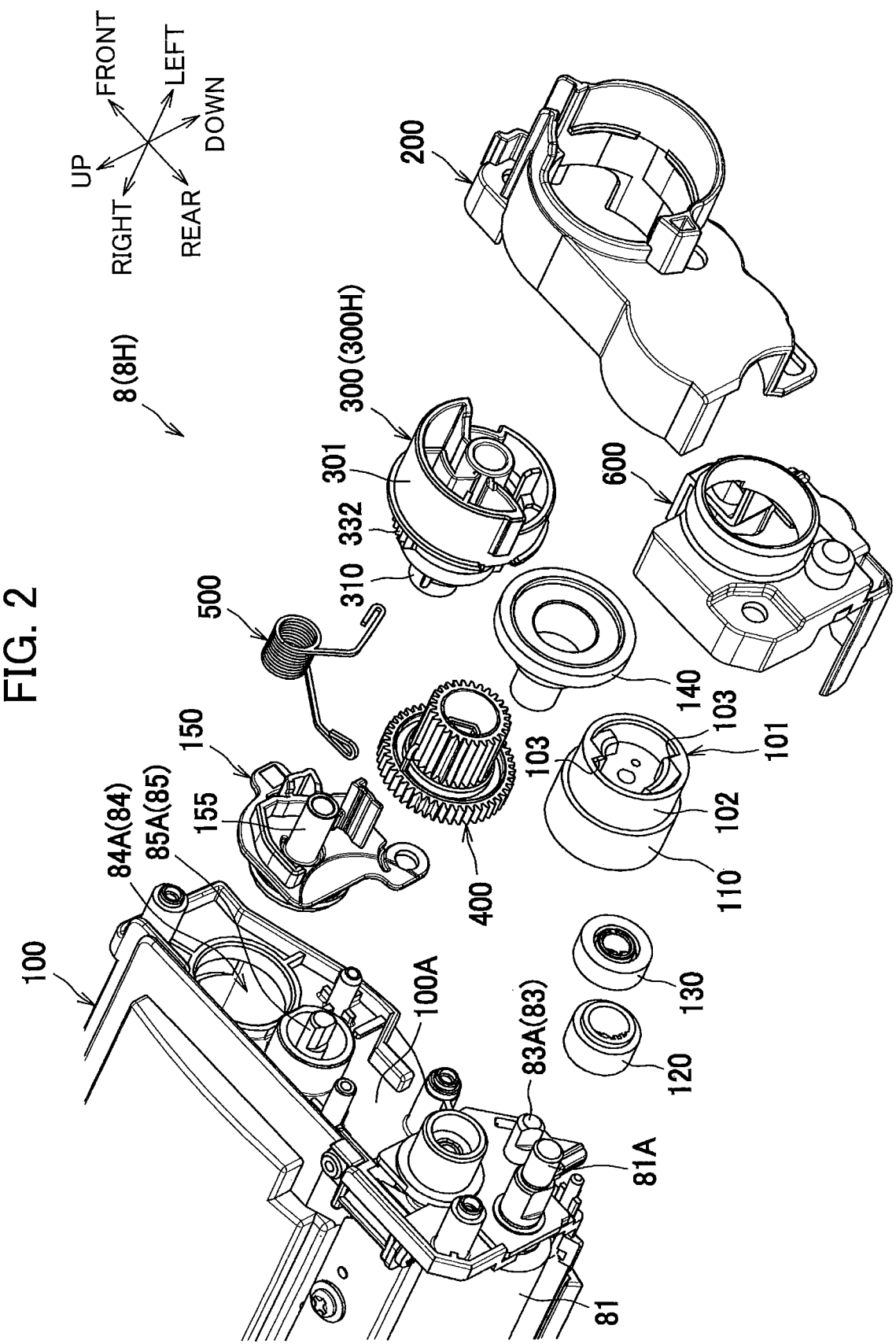
FIG. 2 is an exploded perspective view of components constituting the developing cartridge according to the embodiment.

Note that the high-capacity-type developing cartridge 8H shown in FIGS. 1 and 2 is provided with a high-capacity-type detection gear 300H having a detection protrusion 301H. In contrast, the standard-type developing cartridge 8S is provided with a standard-type detection gear 300S having a detection protrusion 301S.

Figure 3A:
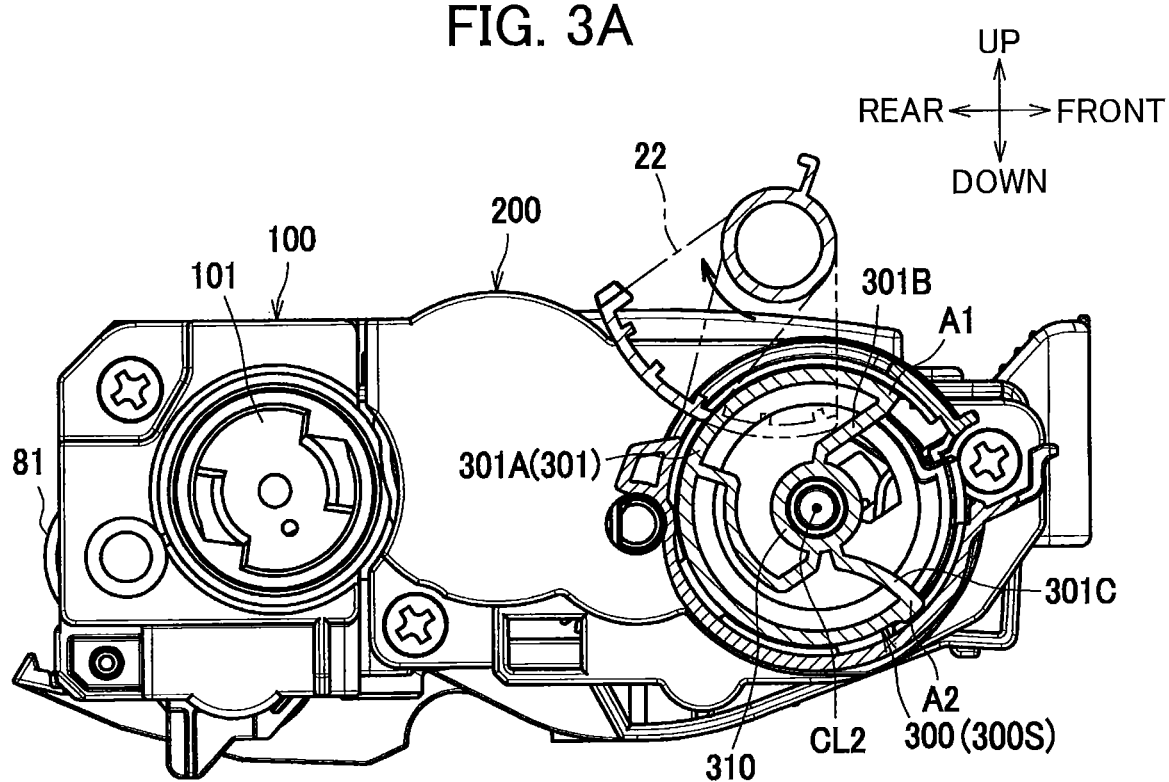
FIG. 3A is a side view illustrating a developing cartridge (standard-type) according to the embodiment and an actuator of an image-forming apparatus.

As shown in FIG. 3A in which the standard-type detection gear 300S is shown as an example, the detection protrusion 301 includes an arcuate-shaped outer peripheral wall 301A centered on the second axis CL2. The detection protrusion 301 includes a first extension wall 301B extending radially inward from a first end portion A1 which is one end of the outer peripheral wall 301A. The detection protrusion 301 includes a second extension wall 301C extending radially inward from a second end portion A2 which is another end of the outer peripheral wall 301A. The first end portion A1 is one end of the outer peripheral wall 301A in a rotation direction of the outer peripheral wall 301A, and the second end portion A2 is the other end opposite to the first end portion A1 in the rotation direction of the outer peripheral wall 301A. The outer peripheral wall 301A, the first extension wall 301B and the second extension wall 301C are arranged at positions offset from the second axis CL2. The first extension wall 301B extends from the first end portion A1 of the outer peripheral wall 301A toward a rotational shaft portion 310 (described later) of the detection gear 300. The first extension wall 301B is connected to the rotational shaft portion 310 of the detection gear 300. The second extension wall 301C extends from the other end of the outer peripheral wall 301A toward the rotational shaft portion 310. The second extension wall 301C is an example of an extending portion, and extends to curve away from the outer peripheral wall 301A of the detection gear 300 while progressing from the second end portion A2 of the outer peripheral wall 301A toward the rotational shaft portion 310. More precisely, the second extension wall 301C extends from the second end portion A2 radially inward and toward upstream in the rotation direction, and the second extension wall 301C curves to be convex toward downstream in the rotation direction. The second extension wall 301C is connected to the rotational shaft portion 310 of the detection gear 300 described later.

A toner-accommodating portion 84 configured to accommodate toner as an example of developer is provided inside the cartridge body 100. An agitator 85 for agitating the toner in the toner-accommodating portion 84 is provided inside the cartridge body 100, and a supply roller 83 configured to supply the toner to the developing roller 81 is provided inside the cartridge body 100.

The cartridge body 100 includes a first outer surface 100A (see FIG. 2) and a second outer surface (not shown) opposite the first outer surface 100A in the left-right direction. The first outer surface 100A is an outer surface of the cartridge body 100 in the left-right direction. As shown in FIG. 2, a boss 155 is provided at the first outer surface 100A of the cartridge body 100. More specifically, the boss 155 extends in the axial direction and is provided at a cap 150 which is a separate member from the cartridge body 100. That is, the boss 155 protrudes relative to the first outer surface 100A of the cartridge body 100. The cap 150 is a lid for closing a fill hole 84A that is provided for filling the toner-accommodating portion 84 with toner.

A gear train including the detection gear 300(300S, 300H) is disposed at the first outer surface 100A.

Figure 3B:
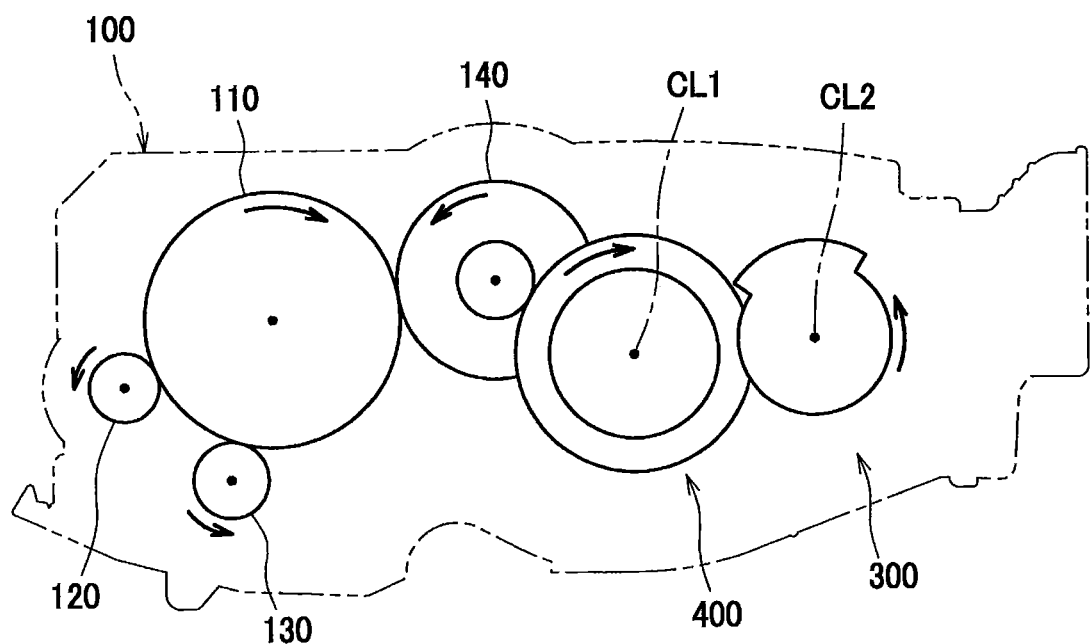
FIG. 3B is a simplified diagram illustrating a gear mechanism provided in the developing cartridge according to the embodiment.

Specifically, as shown in FIGS. 2 and 3B, an input gear 110, a developing-roller drive gear 120, a supply-roller drive gear 130, an idle gear 140, the detection gear 300(300S, 300H) as an example of a second gear, and a transmission gear 400 as an example of a first gear are rotatably provided at the first outer surface 100A. Note that in FIG. 3B, each gear is illustrated in a simplified manner.

The input gear 110 is provided integrally and coaxially with an input coupling 101 (see FIG. 3A) that is configured to receive input of a drive force from a motor (not shown) provided in a main body of an image-forming apparatus. The input gear 110 is thus rotatable together with the input coupling 101. The developing-roller drive gear 120 is supported by a rotation shaft 81A of the developing roller 81, and the developing-roller drive gear 120 is therefore rotatable together with the developing roller 81, and meshes with the input gear 110. The input coupling 101 includes a cylindrical portion 102 and a pair of protrusions 103. The cylindrical portion 102 has a cylindrical shape extending in the axial direction. Each of the protrusions 103 protrudes radially inward from an inner circumferential surface of the cylindrical portion 102. Each of the protrusions 103 can engage with an apparatus-side coupling (not shown) provided in the main body of the image-forming apparatus.

The supply-roller drive gear 130 is supported by a rotation shaft 83A of the supply roller 83. The supply-roller drive gear 130 is rotatable together with the supply roller 83. The supply-roller drive gear 130 is meshed with the input gear 110. The idle gear 140 is meshed with the input gear 110 and the transmission gear 400.

The transmission gear 400 is a gear that is rotatable upon receipt of a drive force from the idle gear 140. The transmission gear 400 is configured to transmit the drive force to the detection gear 300(300S, 300H) intermittently.

The detection gear 300(300S, 300H) is a gear that is rotatable as long as the detection gear 300(300S, 300H) receives the drive force from the transmission gear 400. When the developing cartridge 8(8S, 8H) is in an initial state, the detection protrusion 301(301S, 301H) is positioned at an initial position. When the detection gear 300 (300S, 300H) receives the drive force from the transmission gear 400, the detection gear 300(300S, 300H) starts to move toward its final position. The detection gear 300(300S, 300H) halts its rotation when the detection gear 300(300S, 300H) arrives at the final position.

Hereinafter, the detection gear 300(300S, 300H) will be described in detail.

First, a detailed structure of the standard-type detection gear 300S (or "detection gear 300S") will be described.

Figure 4A:
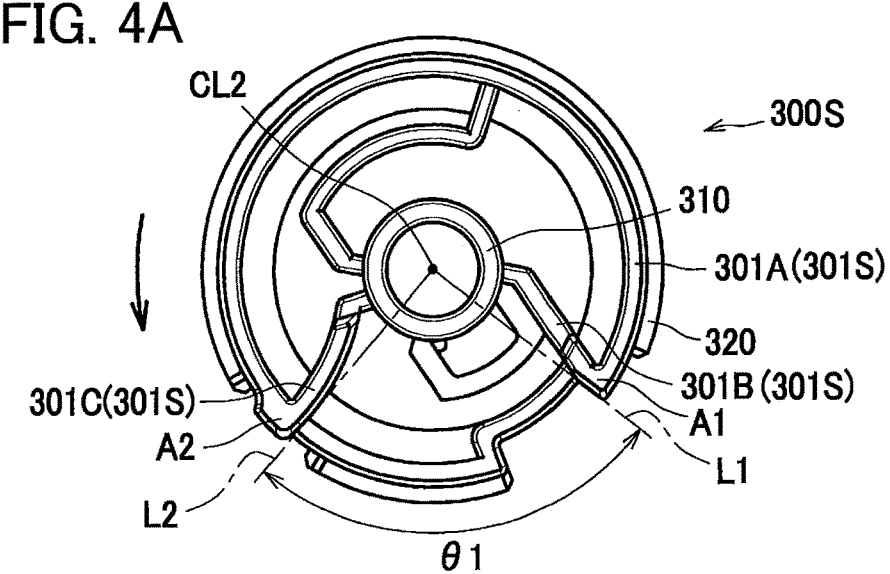
FIG. 4A is a left side view of a standard-type detection gear of the standard-type developing cartridge according to the embodiment.
Figure 4B:
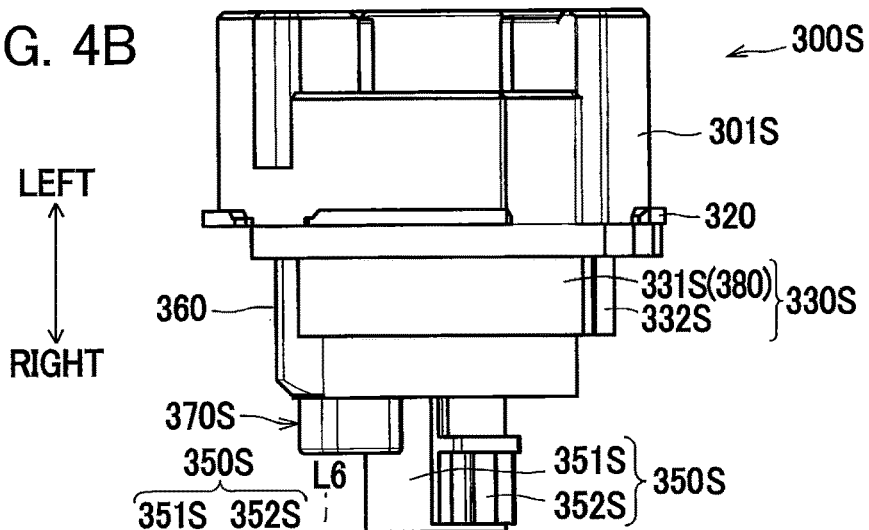
FIG. 4B is a top plan view of the standard-type detection gear.

As shown in FIGS. 4A to 4C and FIG. 26A, the detection gear 300S includes the above-mentioned detection protrusion 301S, the rotational shaft portion 310 as an example of a second columnar portion, a flange portion 320 as an example of a disc portion, a first toothless gear portion 330S, a second rib 340 functioning as a trigger, a second toothless gear portion 350S, a first restriction portion 360, a spring-engaging portion 370S, and a cylindrical portion 380. The rotational shaft portion 310 extends in the axial direction, and has a cylindrical shape centered on the second axis CL2. The rotational shaft portion 310 is rotatable relative to the cartridge body 100. The rotational shaft portion 310 has a diameter that is smaller than a diameter of the cylindrical portion 380. The diameter of the rotational shaft portion 310 is smaller than a diameter of a first toothless portion 331S to be described later. As shown in FIG. 2, the rotational shaft portion 310 is rotatably supported by the boss 155 provided at the first outer surface 100A of the cartridge body 100. As shown in FIG. 26, the rotational shaft portion 310 has a circumferential surface from which a rib 311 protrudes to be in contact with an end face of a second gear portion 352S (described later) in the axial direction. As shown in FIG. 4B, the flange portion 320, the first toothless gear portion 330S, and the second toothless gear portion 350S are arranged in the order mentioned, from the upper side in FIG. 4B (outward in the axial direction) toward the lower side in FIG. 4B (inward in the axial direction: toward the cartridge body 100). That is, in the axial direction, a distance between the first outer surface 100A and the first toothless gear portion 330S is larger than a distance between the first outer surface 100A and the second toothless gear portion 350S. Further, in the axial direction, the distance between the first outer surface 100A and the first toothless gear portion 330S is smaller than a distance between the first outer surface 100A and the flange portion 320.

The flange portion 320 extends radially outward from a substantially center portion of the rotational shaft portion 310 in the axial direction. The flange portion 320 is rotatable about the second axis CL2. The flange portion 320 is positioned farther than the first toothless gear portion 330S, from the cartridge body 100. The detection protrusion 301S is positioned at a surface of the flange portion 320, the surface being opposite to another surface of the flange portion 320 facing the cartridge body 100. The detection protrusion 301S is formed to protrude leftward from the surface of the flange portion 320 that is opposite to the other surface of the flange portion 320 facing the cartridge body 100. More precisely, the detection protrusion 301S protrudes away from the cartridge body 100 in the axial direction. The detection protrusion 301S can rotate together with a first gear portion 332S and the second gear portion 352S described later.

The cylindrical portion 380 is an example of a first columnar portion, and has a cylindrical shape extending in the axial direction and centered on the second axis CL2. The cylindrical portion 380 extends toward the cartridge body 100 from the other surface of the flange portion 320 that faces the cartridge body 100. The rotational shaft portion 310 is positioned inside the cylindrical portion 380.

Figure 4C:
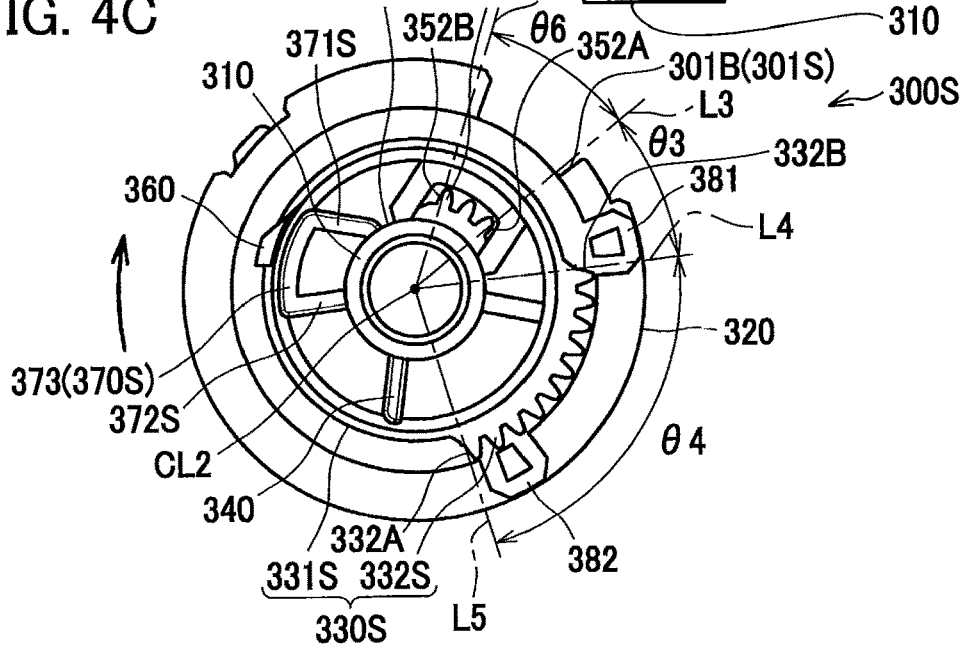
FIG. 4C is a right side view of the standard-type detection gear.

The first toothless gear portion 330S includes the first toothless portion 331S and the first gear portion 332S. The first toothless portion 331S includes a plurality of gear teeth. The first toothless portion 331S includes an outer peripheral surface that forms a generally cylindrical shape. The position of the first gear portion 332S in the axial direction is the same position as the first toothless portion 331S in the axial direction. Each of the plurality of the gear teeth of the first gear portion 332S protrudes radially outward from a circumferential surface of the cylindrical portion 380. The first toothless portion 331S is provided on the circumferential surface of the cylindrical portion 380. The plurality of gear teeth of the first gear portion 332 extends along a portion of the circumferential surface of the cylindrical portion 380. The first gear portion 332S is an example of a first engagement portion, and is engageable with a small-diameter gear portion 450 of the transmission gear 400 described later. As shown in FIG. 4C, the first gear portion 332S includes a third end portion 332A and a fourth end portion 332B. The third end portion 332A is an end of the gear teeth of the first gear portion 332S which are positioned at the most downstream in the rotation direction, while the fourth end portion 332B is another end of the gear teeth of the first gear portion 332S which are positioned at the most upstream in the rotation direction. The third end portion 332A is one end of the first gear portion 332S in the rotation direction of the first gear portion 332S. The fourth end portion 332B is the other end of the first gear portion 332S that is opposite the third end portion 332A in the rotation direction. The fourth end portion 332B positioned upstream in the rotation direction of the first gear portion 332S is positioned downstream of the first extension wall 301B of the detection protrusion 301S. The number of gear teeth of the first gear portion 332 differs according to the specifications of the developer cartridge 8. In the standard-type developing cartridge 8S, an angle θ4 between a line segment L4 connecting the fourth end portion 332B of the first gear 332S and the second axis CL2 and a line segment L5 connecting the third end portion 332A and the second axis CL2 is set in a range from 73° to 78°. In this embodiment, the angle θ4 is 74°.

Between the first toothless gear portion 330S and the flange portion 320, a first protrusion 381 and a second protrusion 382 are provided. Each of the first protrusion 381 and the second protrusion 382 protrudes further radially outward relative to tips of the first gear portion 332S. The first protrusion 381 is positioned at a position generally opposite the first restriction portion 360 described later with respect to the second axis CL2. The second protrusion 382 is positioned downstream of the first protrusion 381 in the rotation direction. Note that, in the high-capacity-type detection gear 300H, only one first protrusion 381 is provided (see FIG. 5C).

As shown in FIG. 4B, the second toothless gear portion 350S is positioned away from the first toothless gear portion 330S by a prescribed distance downward in the drawing (i.e. rightward). The second toothless gear portion 350S includes a second toothless portion 351S and the second gear portion 352S. The second gear portion 352S includes a plurality of gear teeth. The second toothless portion 351S includes an outer peripheral surface that forms a generally cylindrical shape. The position of the second gear portion 352 is the same position of the second toothless portion 351 in the axial direction. Each of the plurality of gear teeth of the second gear portion 352S protrudes radially outward from the circumferential surface of the rotational shaft portion 310. The rotational shaft portion 310 corresponds to a second columnar portion. The plurality of gear teeth of the second gear portion 352S is an example of a second engagement portion. The plurality of gear teeth of the second gear portion 352S extends along a portion of the circumferential surface of the rotational shaft portion 310. The second toothless portion 351S is provided on the circumferential surface of the rotational shaft portion 310. The second gear portion 352S has a diameter that is smaller than a diameter of the first gear portion 332S. In this embodiment, a distance from the second axis CL2 to the tips of the gear teeth of the first gear portion 332S is 11.5 mm, whereas a distance from the second axis CL2 to tips of the gear teeth of the second gear portion 352S is 6.7 mm.

A rotational locus defined by rotation of the tips of the gear teeth of the second gear portion 352S is smaller than a rotational locus defined by rotation of the tips of the gear teeth of the first gear portion 332S.

The second gear portion 352S is positioned closer to the cartridge body 100 than the first gear portion 332S is in the axial direction (see FIG. 2), and is engageable with a large-diameter gear portion 440 (described later) of the transmission gear 400. The second gear portion 352S is positioned upstream relative to the first gear portion 332S in the rotation direction, and is configured to engage the large-diameter gear portion 440 after the first gear portion 332S engages the small-diameter gear portion 450. The second gear portion 352 has a fifth end portion 352A and a sixth end portion 352B. The fifth end portion 352A is an end of the gear teeth of the second gear portion 352S which are positioned at the most downstream in the rotation direction. The sixth end portion 352B is an end of the gear teeth of the second gear portion 352S which are positioned at the most upstream in the rotation direction. The fifth end portion 352A is one end of the second gear portion 352S, and the sixth end portion 352B is the other end opposite the fifth end portion 352A of the second gear portion 352S in the rotation direction. The fifth end portion 352A is positioned closer to the fourth end portion 332B than the sixth end portion 352B is in the rotation direction. The structure of the second gear portion 352 and the positional relationship between the second gear portion 352 and the first gear portion 332 are identical for both of the standard-type detection gear 300S and the high-capacity-type detection gear 300H. More specifically, as shown in FIGS. 4C and 5C, an angle θ3 between by a line segment L4 connecting the fourth end portion 332B (upstream end of the first gear portion 332 in the rotation direction) and the second axis CL2 and a line segment L3 connecting the fifth end portion 352A (downstream end of the second gear portion 352 in the rotation direction) and the second axis CL2 is set in a range from 35° to 41°. Further, an angle θ6 between the line segment L3 connecting the fifth end portion 352A of the second gear portion 352 and the second axis CL2 and a line segment L6 connecting the sixth end portion 352B and the second axis CL2 is set in a range from 28° to 32°. In this embodiment, the angle θ3 is 38°, and the angle θ6 is 29°.

As shown in FIG. 4B, the spring-engaging portion 370S is configured to be in contact with a torsion spring 500 described later (refer to FIG. 7A). The spring-engaging portion 370S is positioned between the first toothless gear portion 330S and the second toothless gear portion 350S in the axial direction. Specifically, the spring-engaging portion 370S is positioned above and near the second toothless gear portion 350S in FIG. 4B (i.e., leftward relative to the second toothless gear portion 350S). As shown in FIG. 4C, the spring-engaging portion 370S protrudes radially outward from the rotational shaft portion 310. The spring-engaging portion 370 has a length that is greater than a length of the second gear portion 352 in the rotation direction. The length of the spring-engaging portion 370 is greater than a length of a second rib 340 described later in the rotation direction.

More specifically, the spring-engaging portion 370S includes a third rib 371S, a fourth rib 372S, and an arcuate-shaped connecting rib 373. Each of the third rib 371S and the fourth rib 372S protrudes from the outer circumferential surface of the rotational shaft portion 310 in a direction crossing the axial direction. The arc-shaped connecting rib 373 connects a radially outer end of the third rib 371S and a radially outer end of the fourth rib 372S. The third rib 371S is positioned downstream of the fourth rib 372S in the rotation direction. In other words, the third rib 371S is positioned closer to the second gear portion 352S than the fourth rib 372S is in the rotation direction.

The second rib 340 is positioned at the same position as the spring-engaging portion 370S in the axial direction. The second rib 340 is provided at the opposite side of the second axis CL2 from the second gear portion 352. The second rib 340 is positioned at the outer circumferential surface of the rotational shaft portion 310. The second rib 340 extends from the outer circumferential surface of the rotational shaft portion 310 outward in a radial direction of the rotational shaft portion 310 (in a direction crossing the second axis CL2), and is formed in a plate shape (i.e., rib) that extends in a direction intersecting with the rotation direction. A distal end of the second rib 340 which is positioned at an outer end of the second rib 340 in the radial direction is positioned radially inward of the circumferential surface of the first toothless portion 331S and radially outward of the second gear portion 352S. Specifically, the outer end of the second rib 340 is positioned substantially at the same position as the outer circumferential surface of the spring-engaging portion 370S in the radial direction.

As shown in FIG. 4B, the first restriction portion 360 protrudes from the circumferential surface of the cylindrical portion 380. The first restriction portion 360 extends from the cylindrical portion 380, in the axial direction, to a position near one end of the spring-engaging portion 370S that is close to the flange portion 320. As shown in FIG. 4C, the first restriction portion 360 is positioned upstream of the second gear portion 352S and downstream of the second rib 340 in the rotation direction.

The first restriction portion 360 is positioned at substantially the same position as the spring-engaging portion 370S in the rotation direction. The first restriction portion 360 protrudes radially outward at a position near the outer circumferential surface of the spring-engaging portion 370S such that a distal end of the first restriction portion 360 is positioned radially outward of the circumferential surface of the first toothless portion 331S. A surface of the first restriction portion 360, which is positioned upstream in the rotation direction, is a plane that is substantially orthogonal to the rotation direction. Another surface of the first restriction portion 360, which is positioned downstream in the rotation direction, is a sloped surface that slopes radially inward toward downstream in the rotation direction.

Next, a detailed structure of the high-capacity-type detection gear 300H ("detection gear 300H") will be described.

As illustrated in FIGS. 5A to 5C and FIG. 26B, the high-capacity-type detection gear 300H has almost the same structure with the standard-type detection gear 300S. Specifically, the high-capacity-type detection gear 300H includes the detection protrusion 301H, the rotational shaft portion 310, the flange portion 320, a first toothless gear portion 330H (a first toothless portion 331H and a first gear portion 332H), the second rib 340, a second toothless gear portion 350S (a second toothless portion 351S and a second gear portion 352S), the first restriction portion 360, a spring-engaging portion 370H, and the first protrusion 381.

The high-capacity-type detection gear 300H is different from the standard-type detection gear 300S in the following respects.

In the detection gear 300H, the fourth end portion 332B of the first gear portion 332H, which is an upstream end of the first gear portion 332H in the rotation direction, is positioned upstream of the first extension wall 301B of the detection protrusion 301H. An angle θ5 between the line segment L4 connecting the fourth end portion 332B of the first gear portion 332H and the second axis CL2 and the line L5 connecting the third end portion 332A of the first gear portion 332H and the second axis CL2 is set within a range from 146° to 150°. In this embodiment, the angle θ5 is 147°.

The spring-engaging portion 370H includes a third rib 371H and a fourth rib 372H. The fourth rib 372H is positioned on the opposite side of the second rib 340 from the third rib 371H in the rotating direction. The third rib 371H is positioned at substantially the same position as an upstream portion of the second gear portion 352H in the rotation direction. Further, the fourth rib 372H is positioned on the opposite side of the second axis CL2 from the third rib 371H. An arcuate wall 341 connects the third rib 371H and the second rib 340.

Figure 6A:
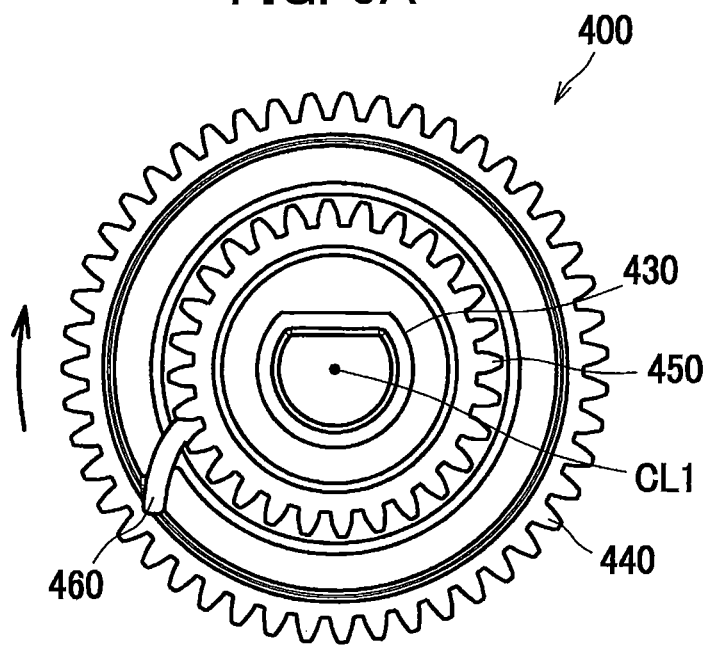
FIG. 6A is a left side view of a transmission gear.
Figure 6B:
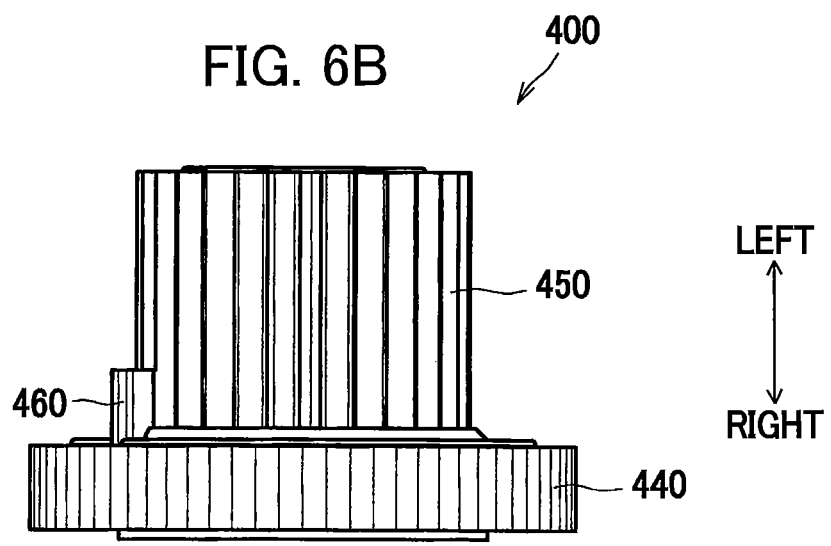
FIG. 6B is a top plan view of the transmission gear.

As shown in FIG. 3B, the transmission gear 400 is a gear rotatable about the first axis CL1 extending in the axial direction. The transmission gear 400 is positioned upstream of and adjacent to the detection gear 300 in a transmission direction of the drive force. The transmission gear 400 is supported by a rotation shaft 85A of the agitator 85 (see FIG. 2) so as to be rotatable together with the agitator 85. As shown in FIGS. 6A and 6B, the transmission gear 400 integrally includes a rotational shaft portion 430, a large-diameter gear portion 440, a small-diameter gear portion 450, and a first rib 460 serving as a trigger. The rotational shaft portion 430 has a substantially hollow cylindrical shape that is centered on the first axis CL1. The first axis CL1 is a rotational axis of the transmission gear 400. In the axial direction, a distance from the first outer surface 100A to the large-diameter gear portion 440 is shorter than a distance from the first outer surface 100A to the small-diameter gear portion 450.

The large-diameter gear portion 440 is a gear having a larger diameter than the small-diameter gear portion 450. The large-diameter gear portion 440 is rotatable about the first axis CL1 together with the small-diameter gear portion 450. The large-diameter gear portion 440 meshes with the idle gear 140 (see FIG. 3B) to receive the drive force from the idle gear 140. Further, in the initial state of the developing cartridge 8(8S, 8H), the large-diameter gear portion 440 faces the second toothless portion 351(351S, 351H) (see FIG. 4C) of the detection gear 300(300S, 300H). After the drive force is inputted into the developing cartridge 8(8S, 8H), the large-diameter gear portion 440 is configured to come into mesh with the second gear portion 352(352S, 352H) of the detection gear 300(300S, 300H) at an appropriate timing.

In the initial state of the developing cartridge 8(8S, 8H), the small-diameter gear portion 450 opposes the first toothless portion 331(331S, 331H) of the detection gear 300 (300S, 300H) (refer to FIG. 4C). The small-diameter gear portion 450 is configured to come into mesh with the first gear portion 332(332S, 332H) of the detection gear 300 (300S, 300H) at an appropriate timing after the drive force is inputted into the developing cartridge 8(8S, 8H).

The first rib 460 is formed in a rib-like shape (plate shape) that extends radially outward (in a direction intersecting with the first axis CL1) from a base end portion of the small-diameter gear portion 450. A surface of the first rib 460, which faces downstream in the rotation direction, is sloped radially outward toward upstream in the rotation direction. As shown in FIG. 15B, the first rib 460 functions to engage with the second rib 340 of the detection gear 300(300S, 300H) to cause the detection gear 300 (300S, 300H) to rotate, thereby bringing the first gear portion 332(332S, 332H) into mesh with the small-diameter gear portion 450. The first rib 460 is provided such that a rotational locus of the first rib 460 overlaps with the rotational locus of the second rib 340. In the initial position shown in FIG. 14B, the first rib 460 is positioned downstream of and spaced away from the second rib 340 in a rotation direction of the transmission gear 400.

Figure 7A:
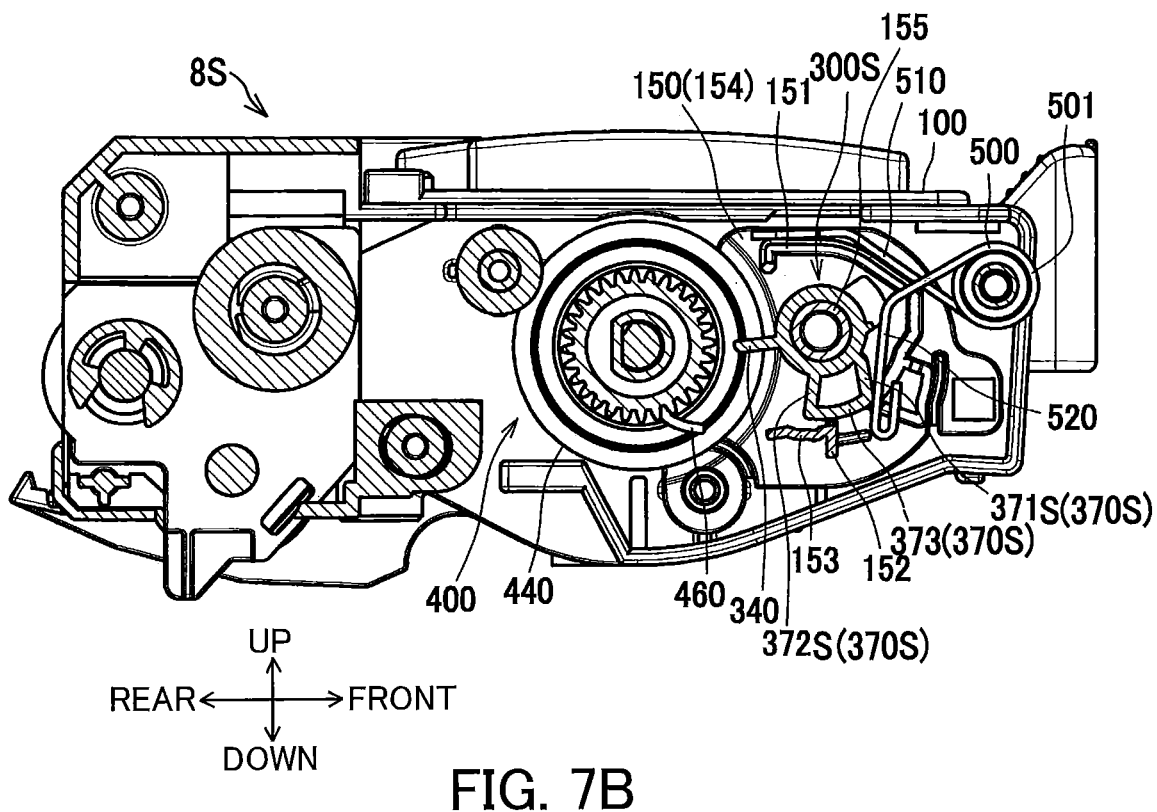
FIG. 7A is a cross-sectional view illustrating a relationship between a standard-type spring-engaging portion and a torsion spring.
Figure 7B:
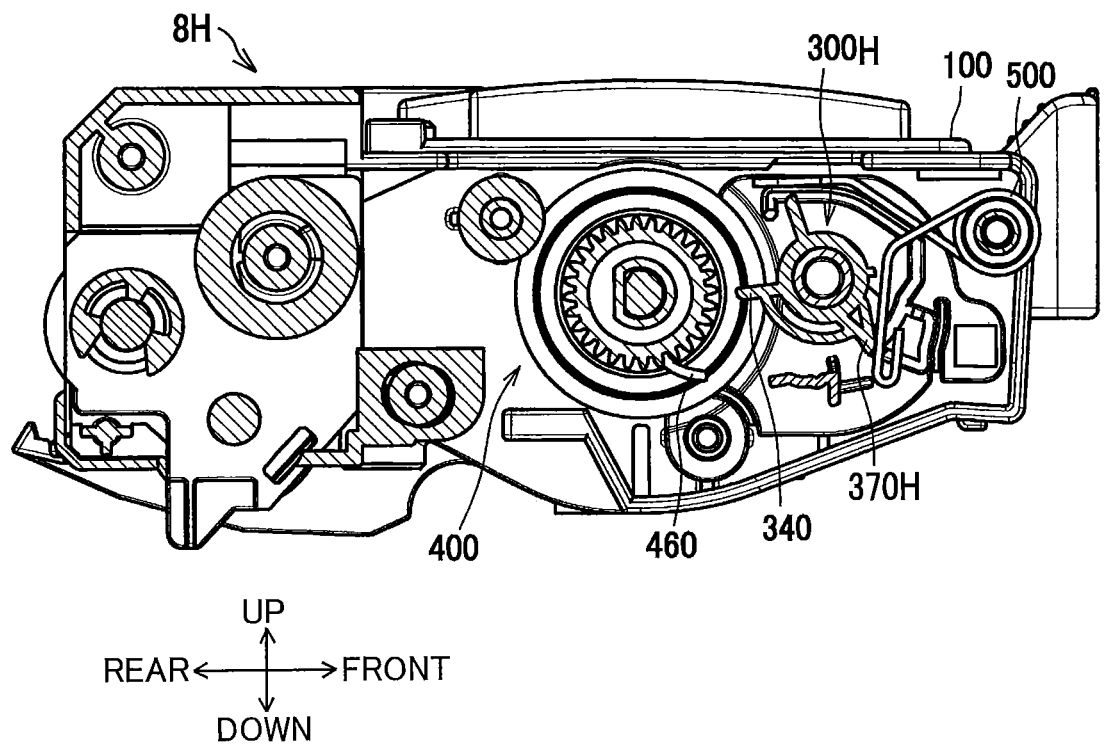
FIG. 7B is a cross-sectional view illustrating a relationship between a high-capacity-type spring-engaging portion and the torsion spring.

As shown in FIGS. 7A and 7B, the torsion spring 500 is engageable with the spring-engaging portion 370(370S, 370H) of the detection gear 300(300S, 300H) is provided at the cartridge body 100. Note that, in FIGS. 7A and 7B and so on, the gear teeth of the large-diameter gear portion 440 are not illustrated for convenience.

The torsion spring 500 is a torsion coil spring. The torsion spring 500 includes a coil portion 501, a first arm 510, and a second arm 520. The first arm 510 extends from the coil portion 501 toward an upper portion of the detection gear 300(300S, 300H). The second arm 520 extends from the coil portion 501 toward the rotational shaft portion 310 of the detection gear 300(300S, 300H). The coil portion 501 includes an axis extending parallel to the second axis CL2. The coil portion 501 is positioned frontward of the cap 150. A distal end of the first arm 510 is in contact with, from above, a spring support portion 151 of the cap 150 described later. The second arm 520 extends from the coil portion 501 toward the rotational shaft portion 310 and is then bent in such a direction that a distal end of the second arm 520 leaves away from the first arm 510. The distal end of the second arm 520 is in contact with the spring-engaging portion 370(370S, 370H) from its front side. The first arm 510 and the second arm 520 extend so as to intersect each other.

The torsion spring 500 urges the detection gear 300(300S, 300H) in a clockwise direction in the drawings in a state where the detection gear 300(300S, 300H) is at the initial position as shown in FIGS. 7A and 7B. In other words, when the detection gear 300(300S, 300H) is at the initial position, the torsion spring 500 urges the third rib 371(371S, 371H) of the detection gear 300(300S, 300H) in a direction opposite the rotation direction of the detection gear 300(300S, 300H) that is rotatable upon receipt of the drive force.

Figure 10A:
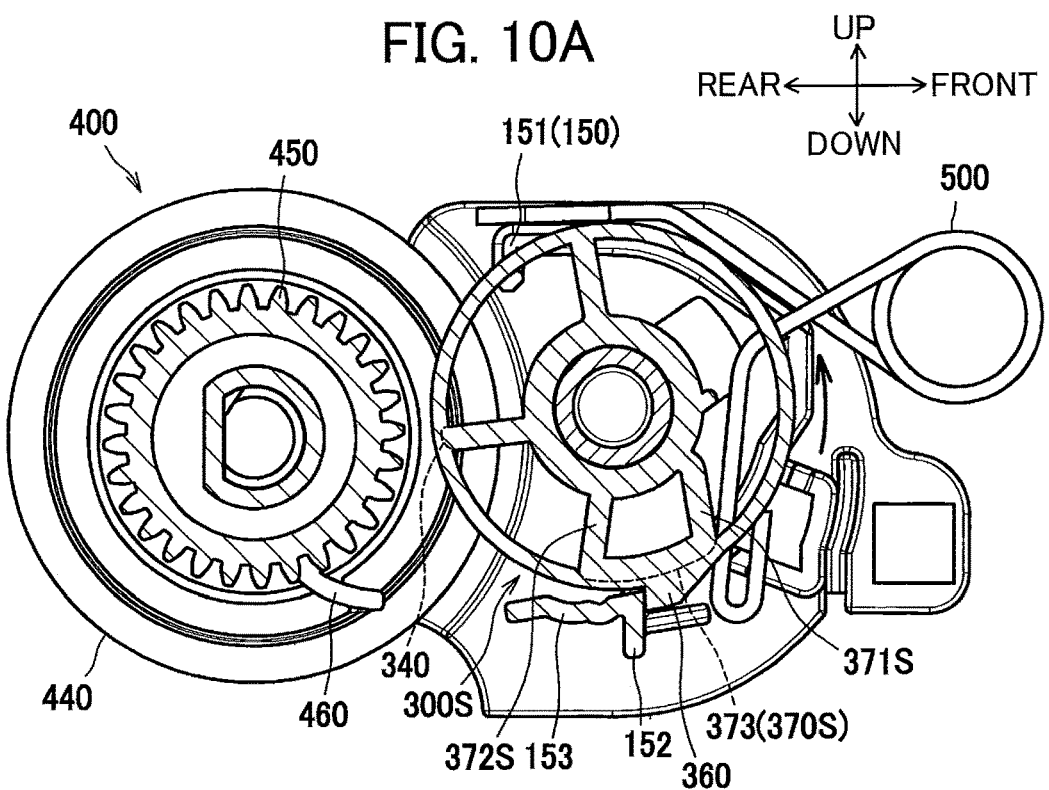
FIGS. 10A and 10B are cross-sectional views illustrating an angle of the standard-type detection gear at an initial position.
Figure 13A:
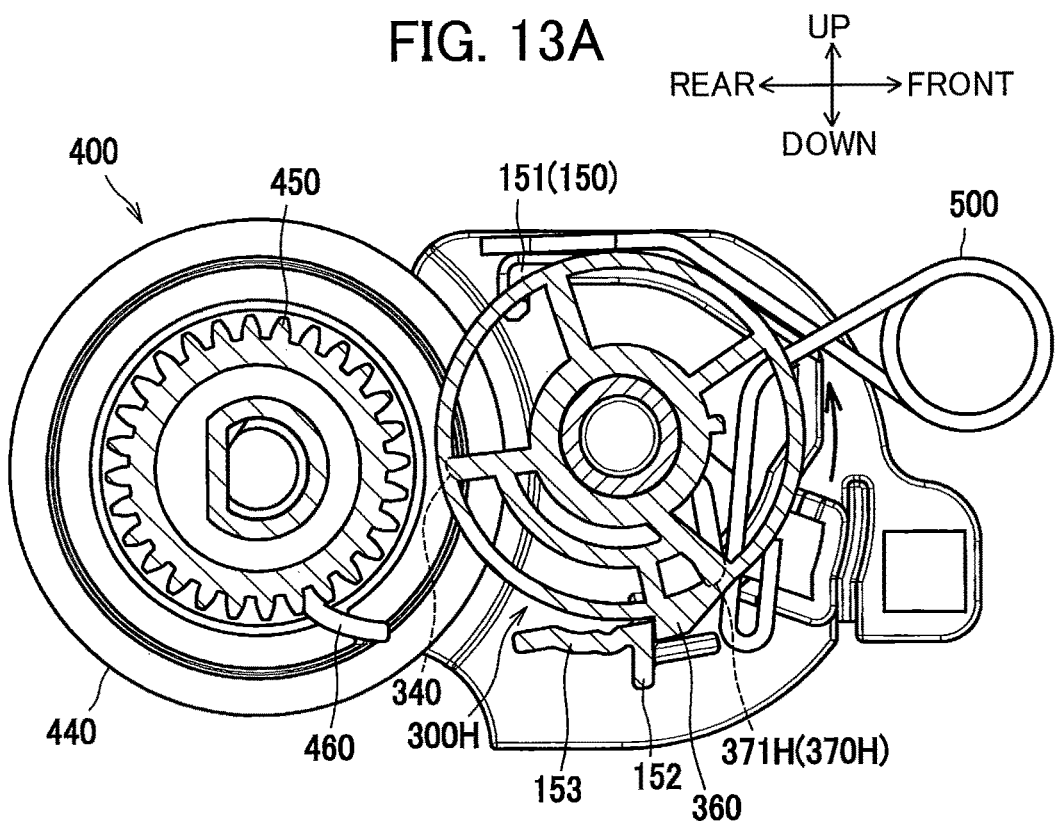
FIGS. 13A and 13B are cross-sectional views illustrating an angle of the high-capacity-type detection gear at the initial position.

The cap 150 includes the spring support portion 151, a restricting portion 152, a holding portion 153, and a plate-shaped base 154. The spring support portion 151 supports one end of the torsion spring 500. The restricting portion 152 restricts the detection gear 300(300S, 300H) at the initial position from rotating in the clockwise direction in the drawing. The holding portion 153 serves to hold the detection gear 300(300S, 300H) at a prescribed inspection position at the time of product inspection. As shown in FIGS. 10A and 13A, the restricting portion 152 is in contact with the first restriction portion 360 of the detection gear 300 (300S, 300H) at the initial position. Specifically, because the torsion spring 500 urges the third rib 371(371S, 371H) of the spring-engaging portion 370(370S, 370H) in the clockwise direction (the direction opposite the rotation direction), the first restriction portion 360 is urged toward the restricting portion 152. Accordingly, the restricting portion 152 restricts movement of the detection gear 300(300S, 300H). The detection gear 300(300S, 300H) is thereby held at the initial position as desired.

The base 154 is positioned at the first outer surface 100A of the cartridge body 100. The spring support portion 151 is a rib protruding in the axial direction from the base 154. The spring support portion 151 extends in a front-rear direction such that the spring support portion 151 extends along a shape of the first arm 510 of the torsion spring 500. The spring support portion 151 includes a surface opposing the rotation shaft 310. The spring support portion 151 also includes another surface that is opposite the surface facing the rotation shaft 310 and that is in contact with the first arm 510 of the torsion spring 500. The restricting portion 152 protrudes from the base 154 to extend in the axial direction. The restricting portion 152 extends in an up-down direction. The holding portion 153 is a rib protruding from the base 154 in the rotational axis direction and extending in the front-rear direction. The holding portion 153 has one end that is connected to one end of the restricting portion 152. The one end of the restricting portion 152 is closer to the detection gear 300(300S, 300H) than another end of the restricting portion 152 is. The holding portion 153 is positioned to face a circumferential surface of the detection gear 300(300S, 300H). A center portion of the holding portion 153 is bent in a direction away from detection gear 300 (300S, 300H). The restricting portion 152 and the holding portion 153 are positioned at the opposite side of the rotational shaft portion 310 from the spring support portion 151. The cap 150 includes the boss 155 that protrudes in the axial direction from the base 154. The boss 155 rotatably supports the rotational shaft portion 310 of the detection gear 300(300S, 300H). The boss 155 is positioned inside the rotational shaft portion 310 of the detection gear 300(300S, 300H).

As shown in FIGS. 14A and 25A, the first gear cover 200 includes an arcuate wall 220 that is located radially outward of the detection protrusion 301(301S, 301H). The arcuate wall 220 extends to form an arc centered on the second axis CL2. In the final position shown in FIGS. 19A and 25A, in both of the standard-type detection gear 300S and high-capacity-type detection gear 300H, the detection protrusion 301(301S, 301H) is positioned such that the second extension wall 301C is positioned downstream relative to an upstream end of the arcuate wall 220 in the rotation direction.

Next, positions of the standard-type detection gear 300S at the time of assembly thereof, at the time of product inspection, and at the time of a brand-new state after completion of production, respectively, will be described.

Figure 8A:
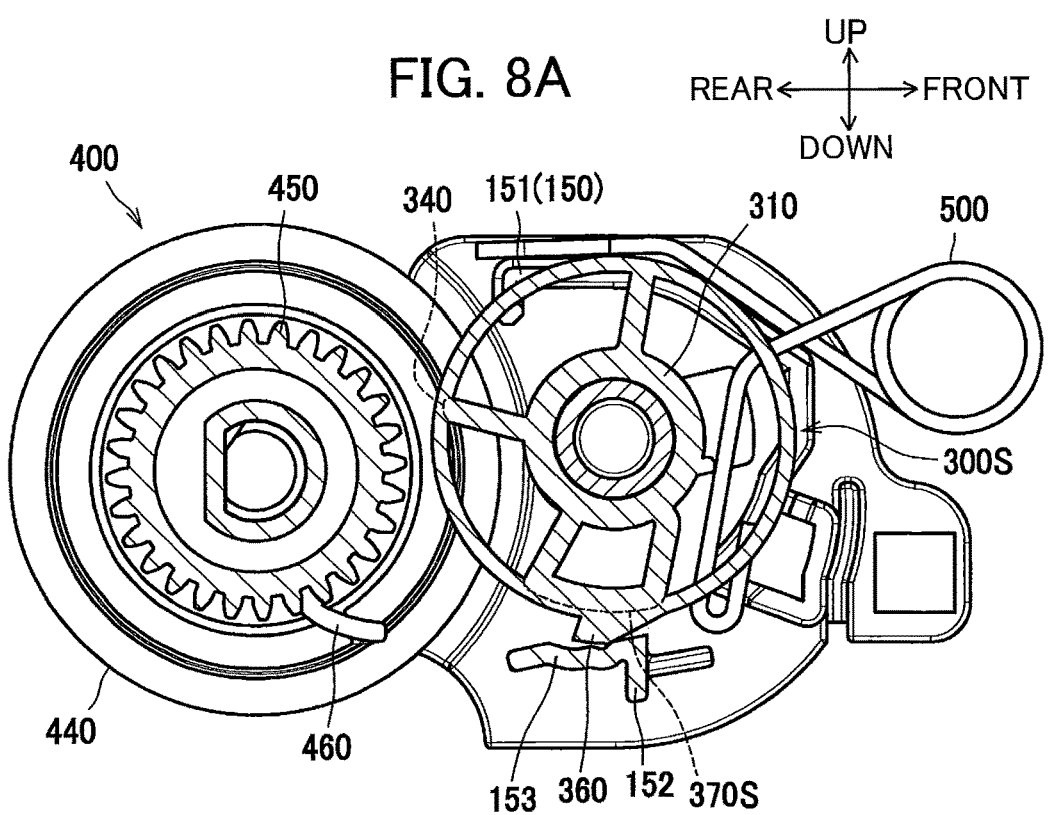
FIGS. 8A and 8B are cross-sectional views illustrating an angle of the standard-type detection gear at an attachment position.
Figure 8B:
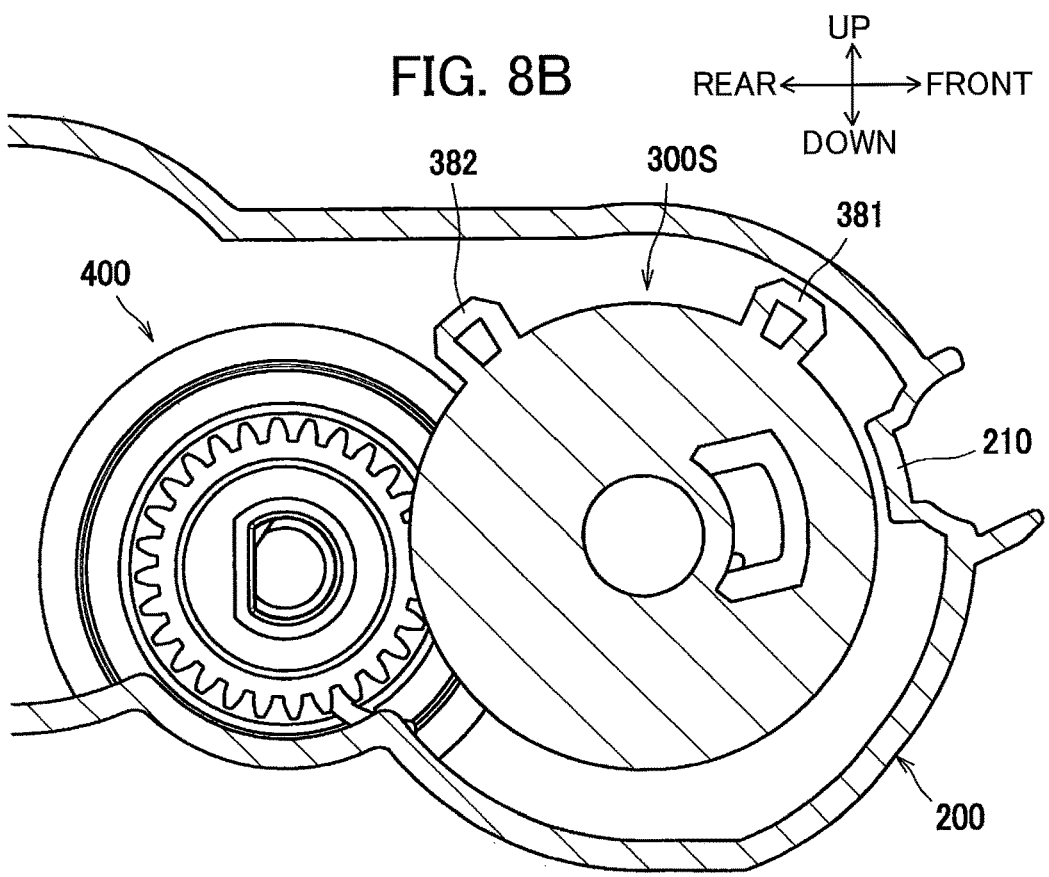
Figure 26A:
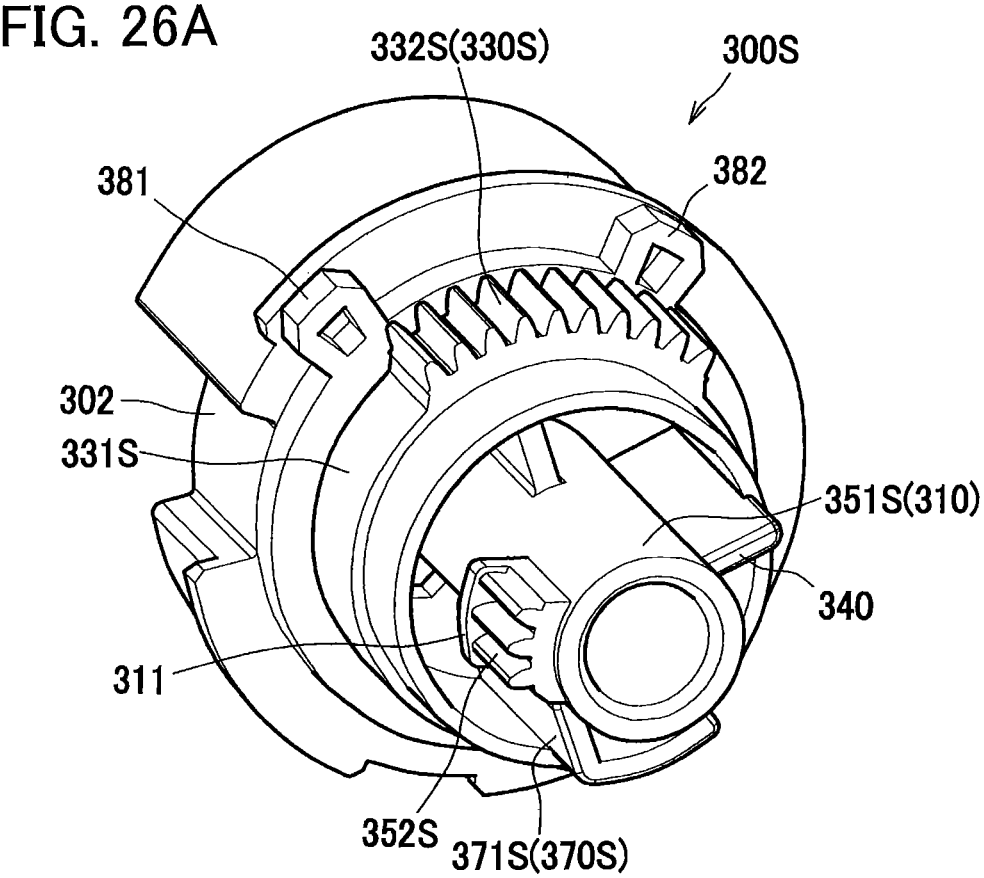
FIG. 26A is a perspective view of the standard-type detection gear.
Figure 26B:
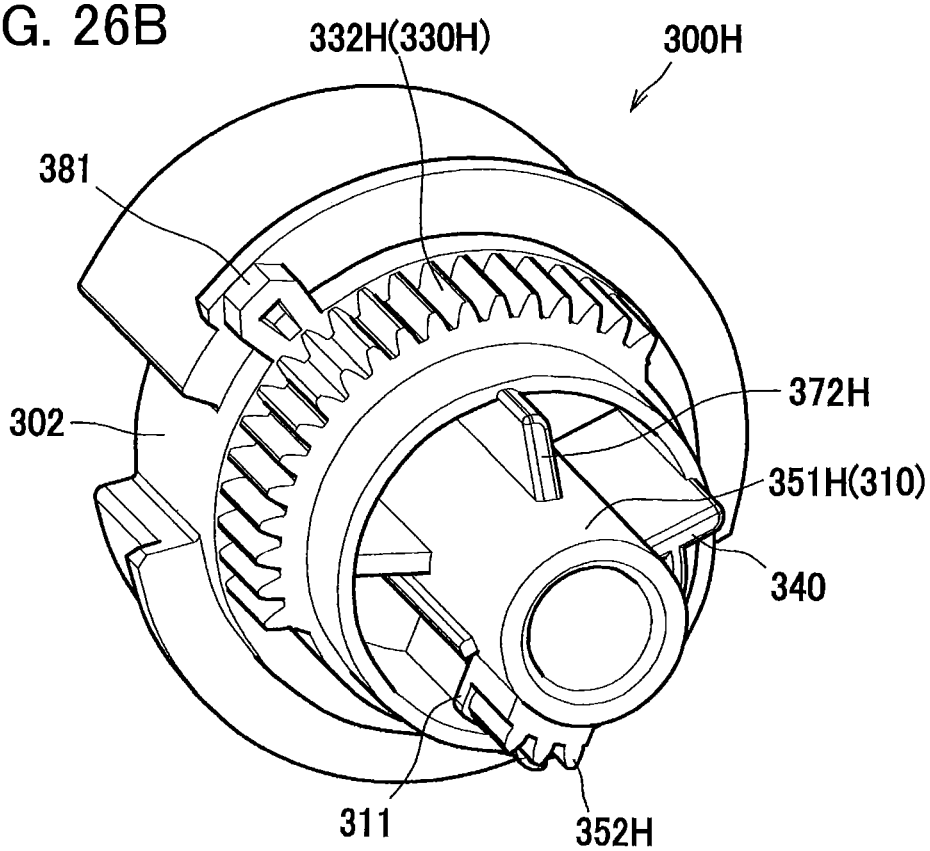
FIG. 26B is a perspective view of the high-capacity-type detection gear.

As shown in FIG. 8A, when assembling the standard-type detection gear 300S to the cartridge body 100, an angle of the detection gear 300S is adjusted such that the detection gear 300S is at an attachment position where the first restriction portion 360 is in contact with a base end portion of the holding portion 153. At this time, the restricting portion 152 and the holding portion 153 hold a posture of the detection gear 300S in a state where the restricting portion 152 and the holding portion 153 deflect downward in the drawing. Further, at this time, the torsion spring 500 is in contact with the rotational shaft portion 310. Accordingly, an urging force of the torsion spring 500 acts toward the second axis CL2 (rotational axis) of the detection gear 300S, not in a direction rotating the detection gear 300S. The detection gear 300S is therefore well held at the attachment position. In the attachment position, a movement restricting portion 210 (see FIG. 8B) is positioned in a groove 302 (see FIG. 26A) formed in a peripheral surface of the detection gear 300S. Note that this groove 302 is also formed in a peripheral surface of the detection gear 300H, as shown in FIG. 26B.

Thereafter the first gear cover 200 (see FIG. 3A) is attached to the cartridge body 100 so as to cover the transmission gear 400 and the like. At this time, because the detection gear 300S is at the attachment position described above, ribs or protrusions extending in the left-right direction from an outer wall of the first gear cover 200 is not in contact with the detection gear 300S. The first gear cover 200 can therefore be easily attached.

Figure 9A:
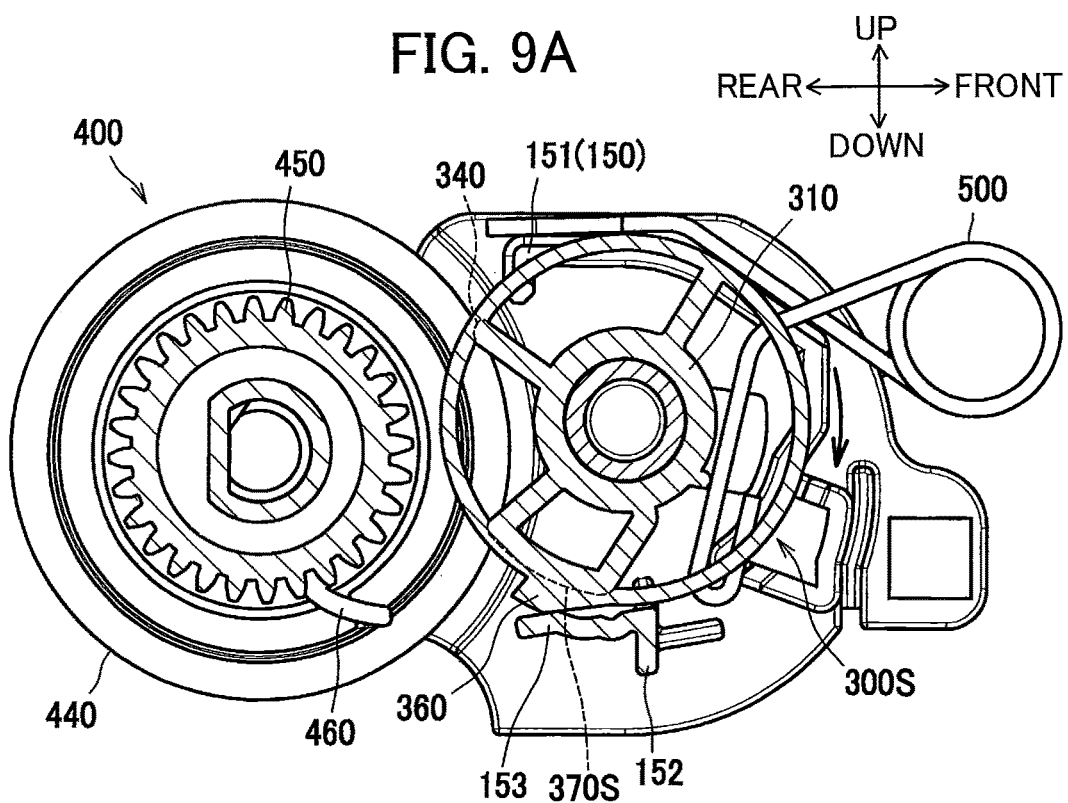
FIGS. 9A and 9B are cross-sectional views illustrating an angle of the standard-type detection gear at an inspection position.
Figure 9B:
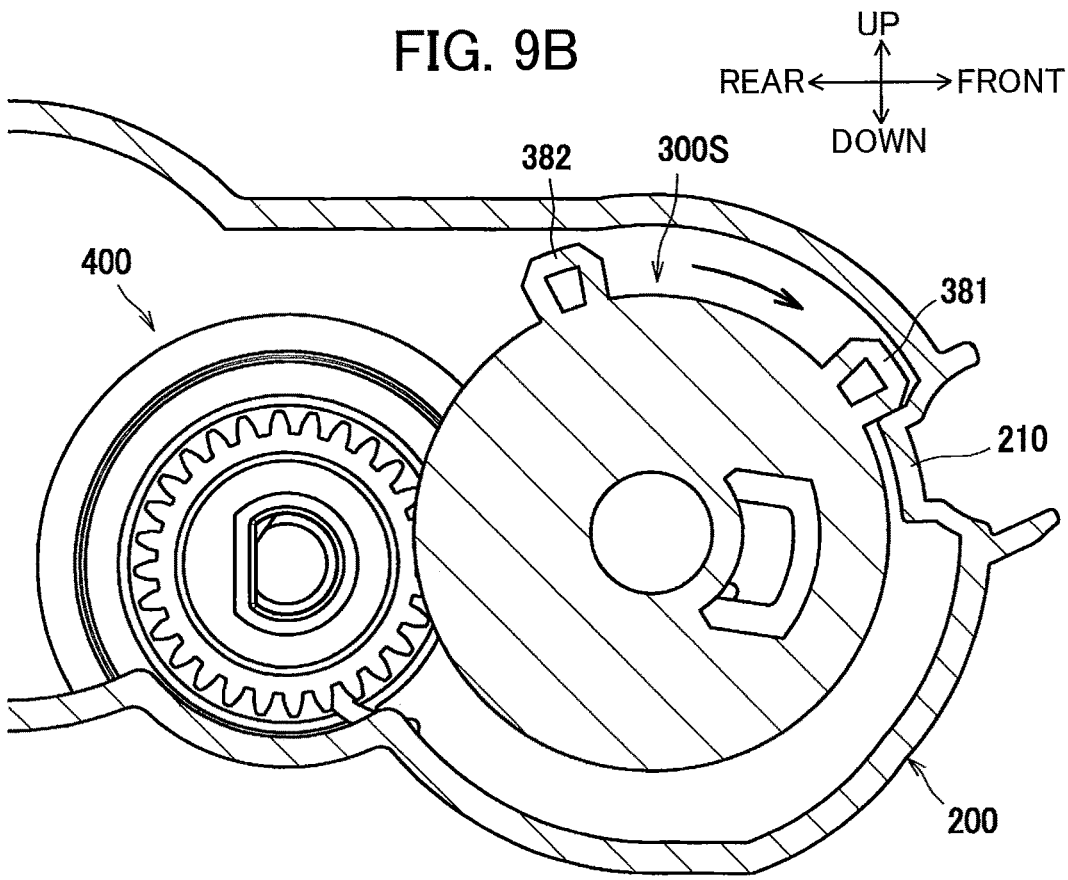

After the first gear cover 200 is attached, as shown in FIG. 9A, an operator rotates the detection gear 300S clockwise. Accordingly, as shown in FIG. 9B, the first protrusion 381 is brought into engagement with the movement restricting portion 210 formed in the first gear cover 200 in the rotation direction. That causes the detection gear 300S to halt at the inspection position. In the inspection position, the first restriction portion 360 is in contact with a distal end of the holding portion 153 and is held by the holding portion 153.

When the detection gear 300S is held at the inspection position in this way, the second rib 340 is positioned outside the rotational locus of the first rib 460. Hence, the first rib 460 does not engage with the second rib 340 even if the drive force is applied to the standard-type developing cartridge 8S during the inspection. As a result, the detection gear 300S is prevented from rotating erroneously.

After the inspection, as shown in FIG. 10A, the operator slightly rotates the detection gear 300S counterclockwise in the drawing and then the first restriction portion 360 is moved to the right side of the restricting portion 152. The angle (rotation angle) of the detection gear 300S is thus adjusted such that the detection gear 300S is in its initial position where the first restriction portion 360 is in contact with a right surface of the restricting portion 152 in the drawing. During this operation, the operator can feel some resistance (or a click) as the first restriction portion 360 moves over the restricting portion 152, thereby enabling the operator to recognize that the detection gear 300S has moved close to the initial position. Further, even if the operator rotates the detection gear 300S counterclockwise excessively to a position downstream of the initial position, the detection gear 300S can move back to the initial position due to the urging force of the torsion spring 500 if the operator releases the detection gear 300S at that position.

Figure 10B:
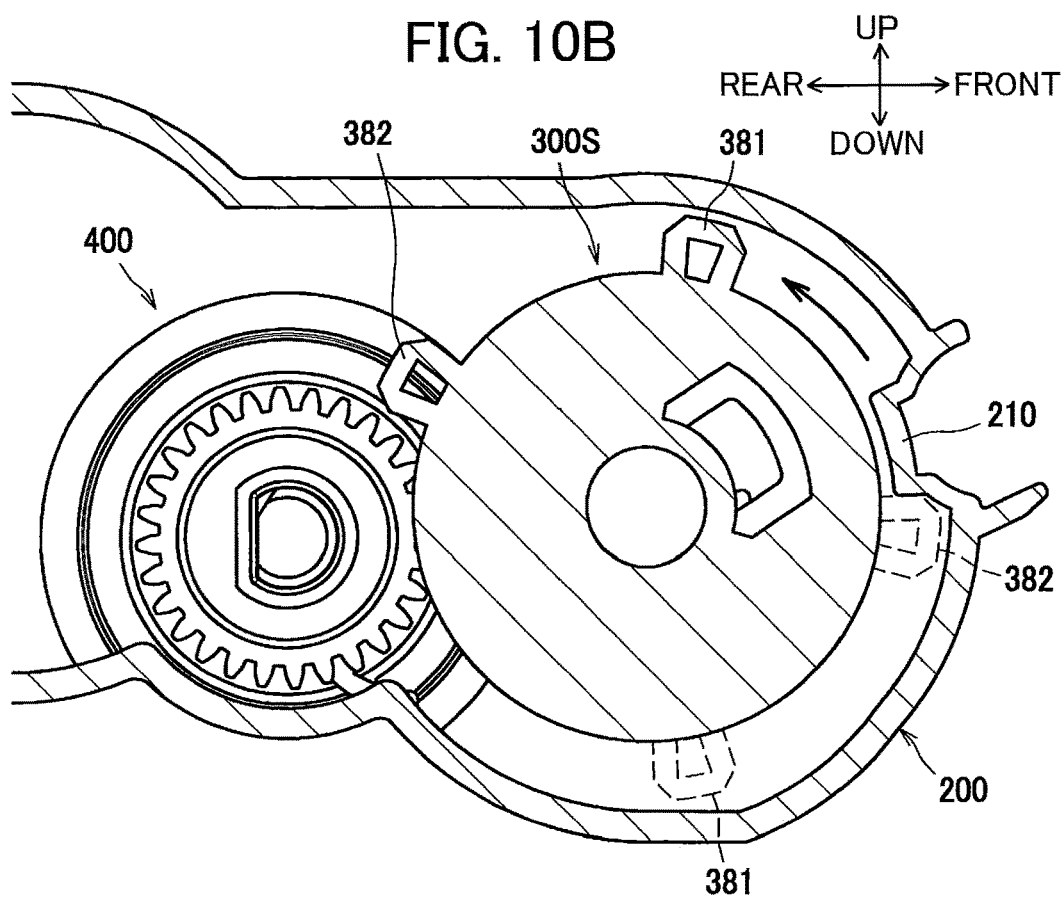
Figure 11A:
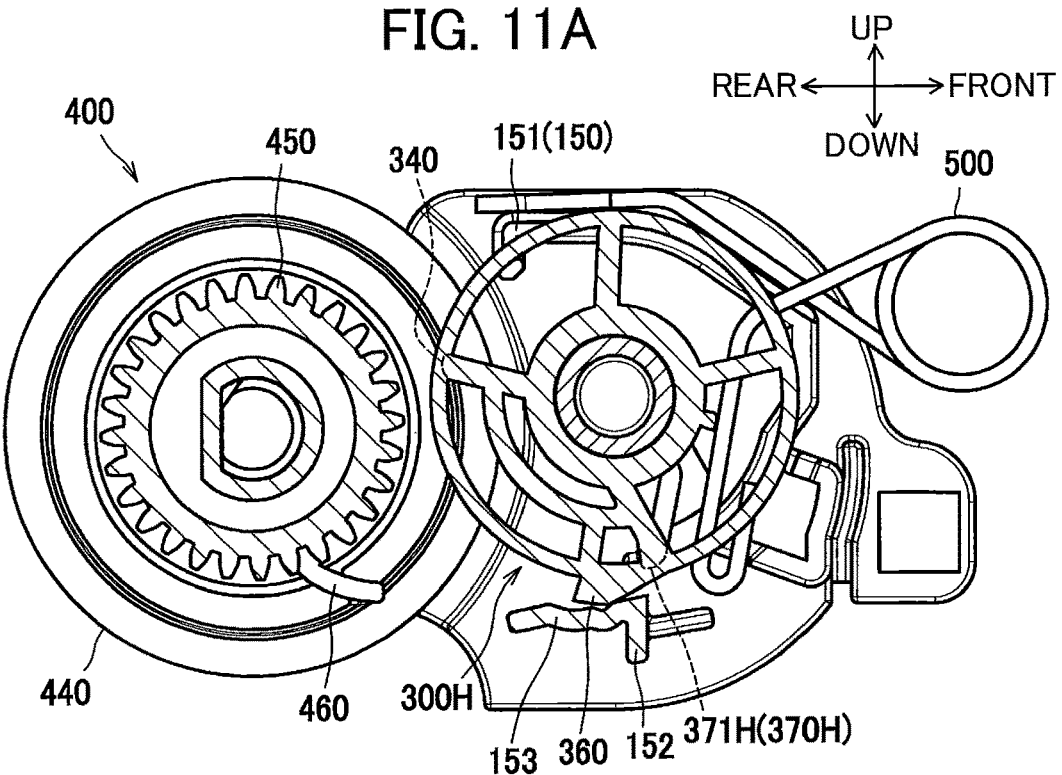
FIGS. 11A and 11B are cross-sectional views illustrating an angle of the high-capacity-type detection gear at the attachment position.
Figure 11B:
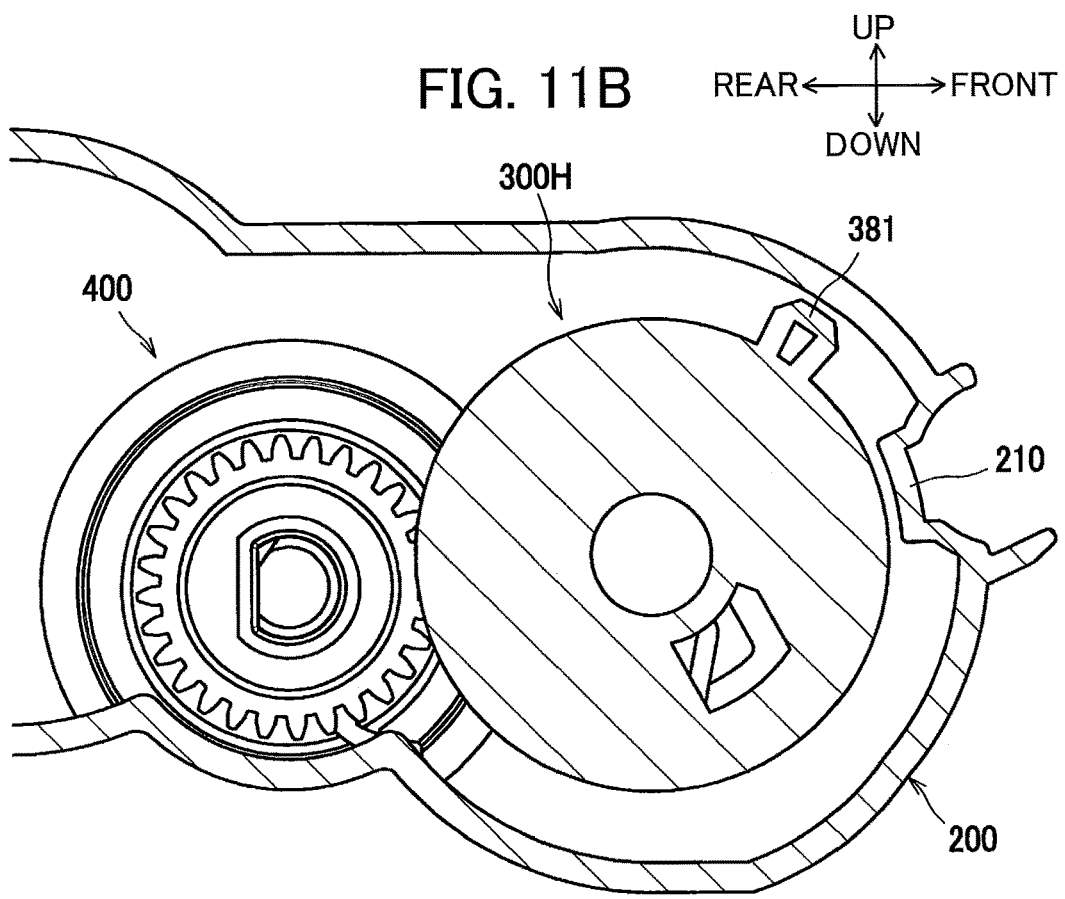
Figure 12A:
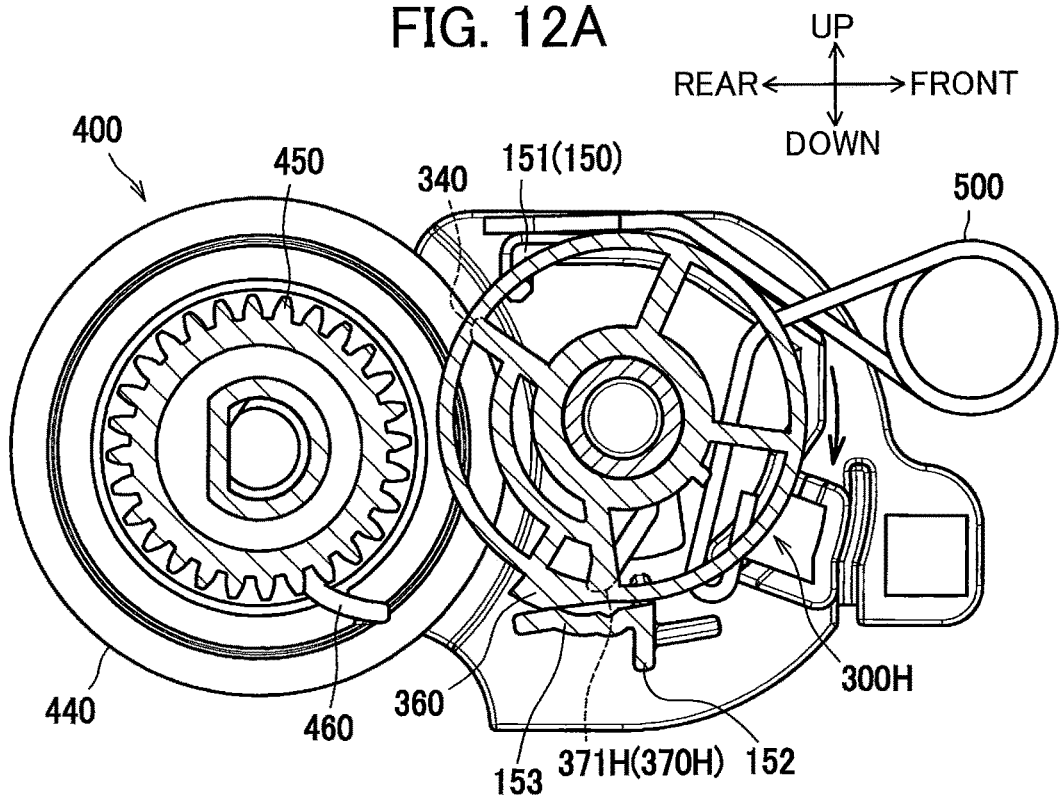
FIGS. 12A and 12B are cross-sectional views illustrating an angle of the high-capacity-type detection gear at the inspection position.
Figure 12B:
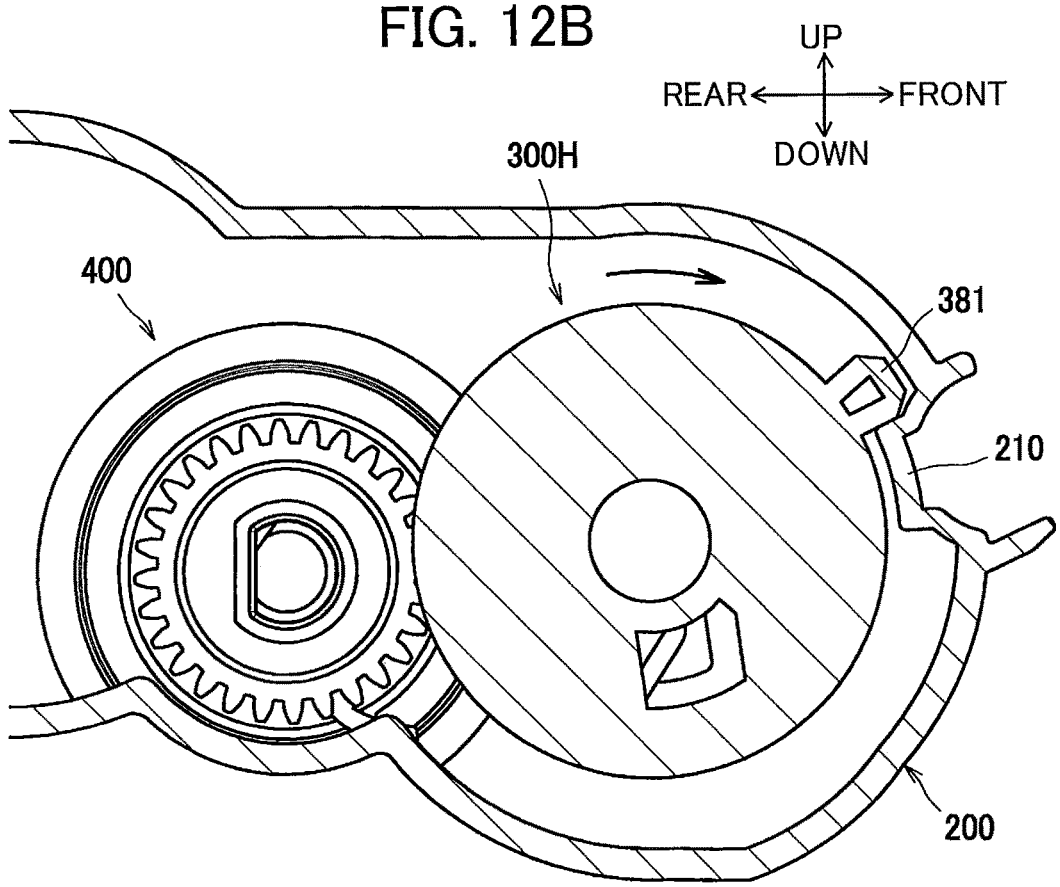

Note that when the detection gear 300S is rotated to its final position, the second protrusion 382 is in contact with an upstream surface of the movement restricting portion 210, as indicated by broken lines in FIG. 10B. The detection gear 300S is thus held at the final position.

Figure 13B:
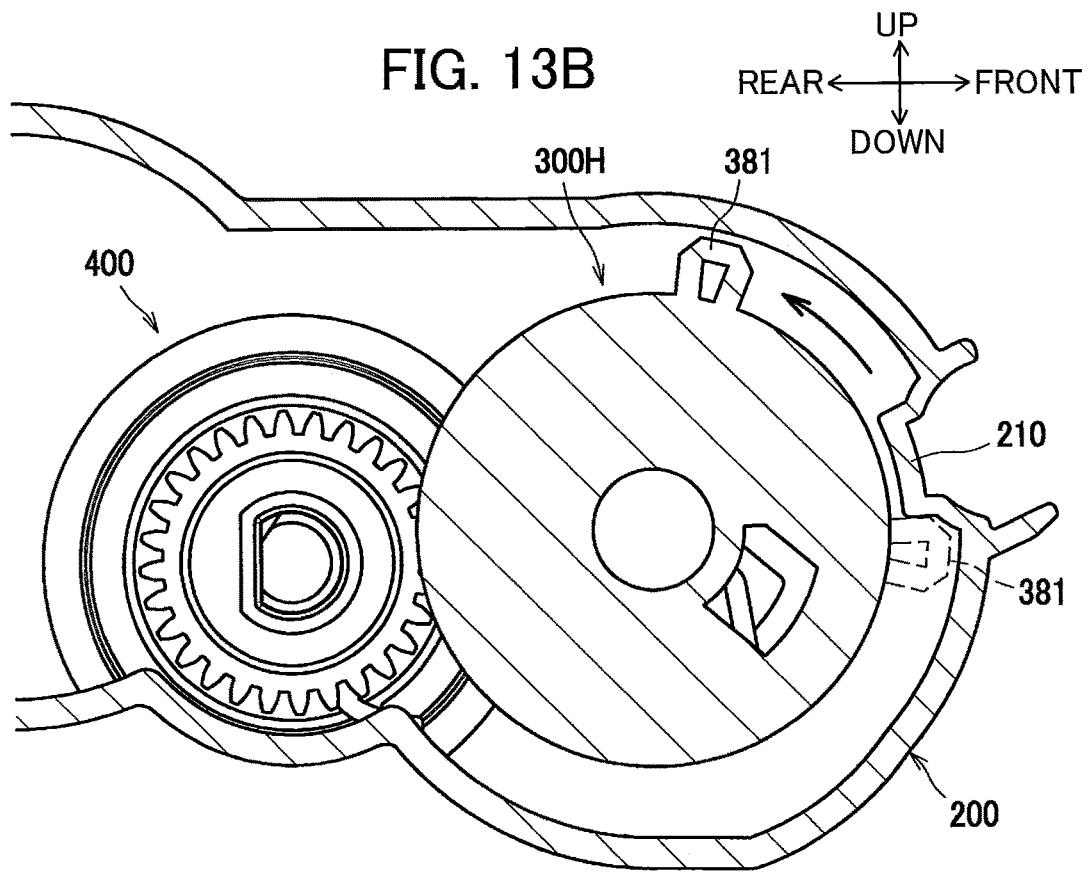

The above described operations for the standard-type detection gear 300S can generally be applied to the high-capacity-type detection gear 300H, as well, as shown in FIGS. 11A through 13B. Note that, when the high-capacity-type detection gear 300H is rotated to its final position as shown in FIG. 13B, the first protrusion 381 abuts on the upstream surface of the movement restricting portion 210, thereby the high-capacity-type detection gear 300H being held at the final position. Each of the operational advantages described above with respect to the standard-type detection gear 300S can also be achieved in the high-capacity-type detection gear 300H.

Next, operations of the transmission gear 400 and the detection gear 300 when the developing cartridge 8 in a brand-new state is used will be described, by taking the standard-type detection gear 300S of as an example.

When the standard-type developing cartridge 8S is in its initial state, in other words, when the standard-type developing cartridge 8S is a new product, as shown in FIGS. 14B and 14C, the small-diameter gear portion 450 of the transmission gear 400 is spaced apart from the first gear portion 332S of the detection gear 300S. Also, the large-diameter gear portion 440 of the transmission gear 400 is spaced apart from the second gear portion 352S of the detection gear 300S. Because the third rib 371S of the detection gear 300S is urged clockwise (i.e., in the direction opposite the rotation direction) by the torsion spring 500, the detection gear 300S is at its initial position. The initial position is an example of a first position. When the detection gear 300S is at the initial position, the second rib 340 is positioned on the rotational locus of the first rib 460. Further, when the detection gear 300S is at the initial position, the first gear portion 332S is positioned outside the rotational locus of the small-diameter gear portion 450.

Figure 16A:
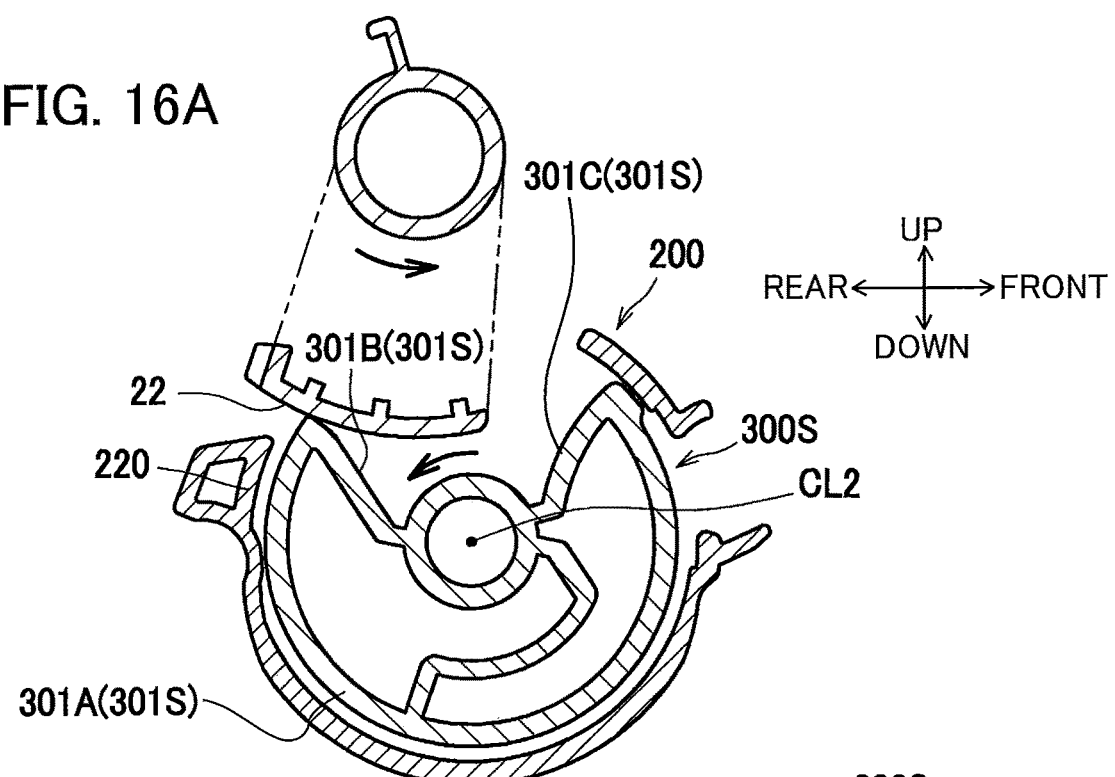
FIGS. 16A through 16C are cross-sectional views illustrating states of various components when the actuator is separated from an outer peripheral surface of a detection protrusion of the standard-type detection gear.
Figure 16B:
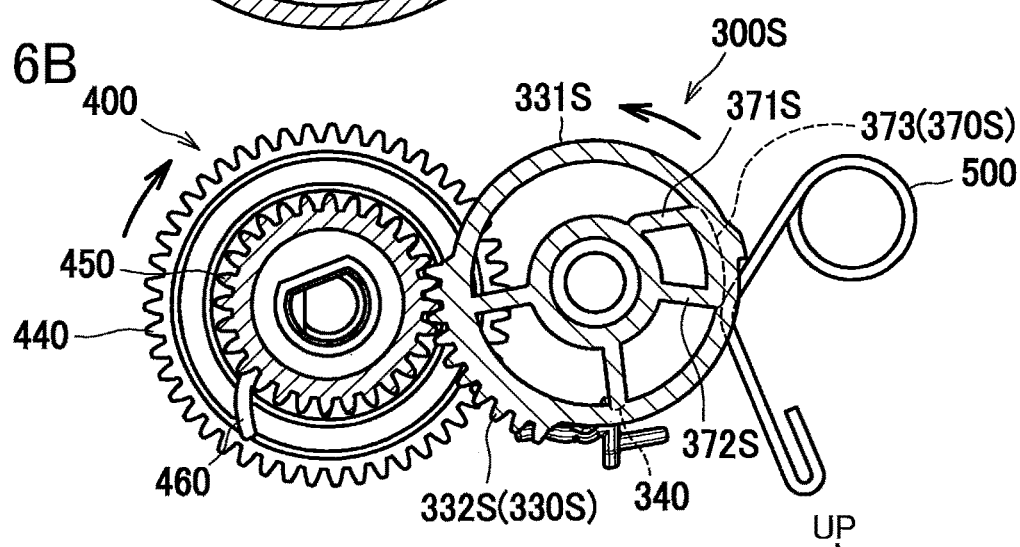
Figure 16C:
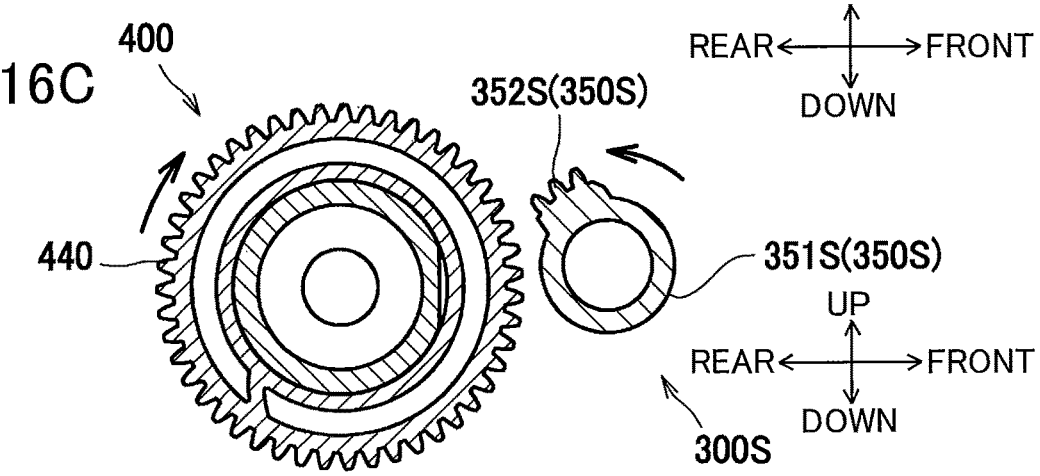

When a drive force is input to the standard-type developing cartridge 8S in the initial state, the transmission gear 400 rotates clockwise in the drawing, thereby causing the first rib 460 to rotate clockwise. Thereafter, as shown in FIG. 15B, the first rib 460 is in contact with the second rib 340 of the detection gear 300S, and the first rib 460 presses the second rib 340 downward in the drawing against the urging force of the torsion spring 500. The detection gear 300S is thereby rotated by a prescribed amount, and that causes the first gear portion 332S of the detection gear 300S to mesh with the small-diameter gear portion 450 of the transmission gear 400 to further rotate the detection gear 300S as shown in FIGS. 16A to 16C. The position of the detection gear 300S shown in FIG. 15B is an example of a second position.

Figure 17A:
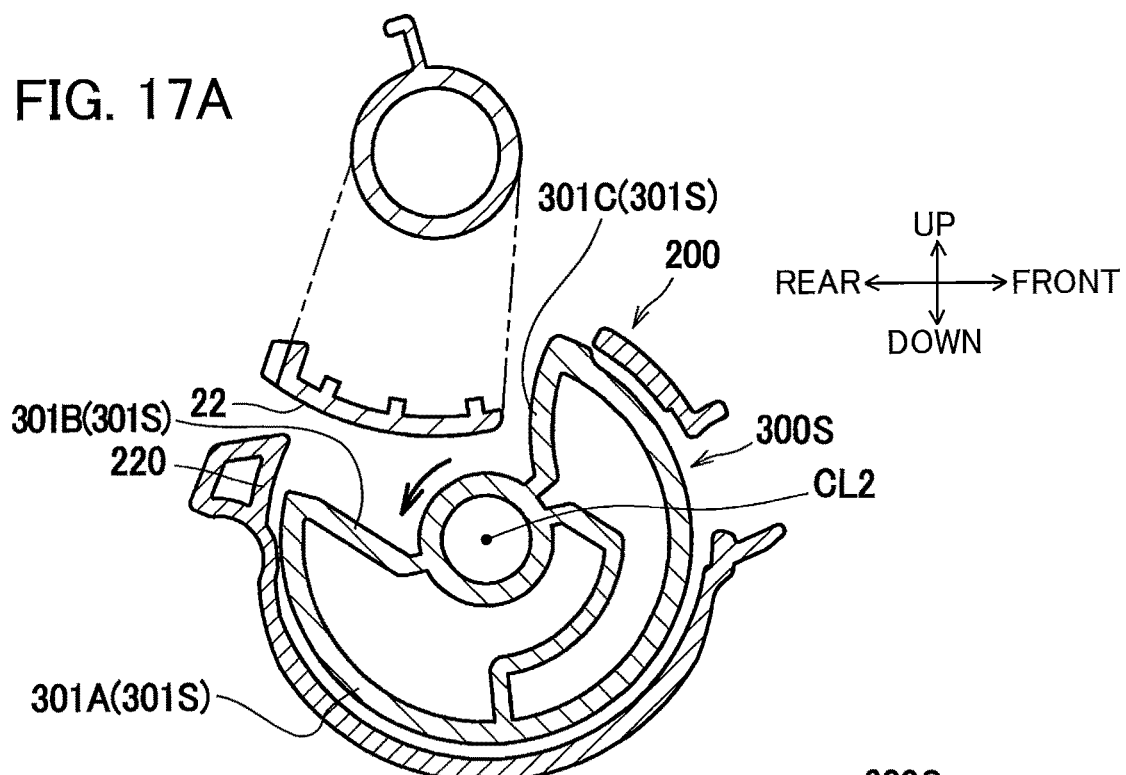
FIGS. 17A through 17C are cross-sectional views illustrating states of various components when the first gear portion of the standard-type detection gear is separated from the small-diameter gear portion of the transmission gear.
Figure 17B:
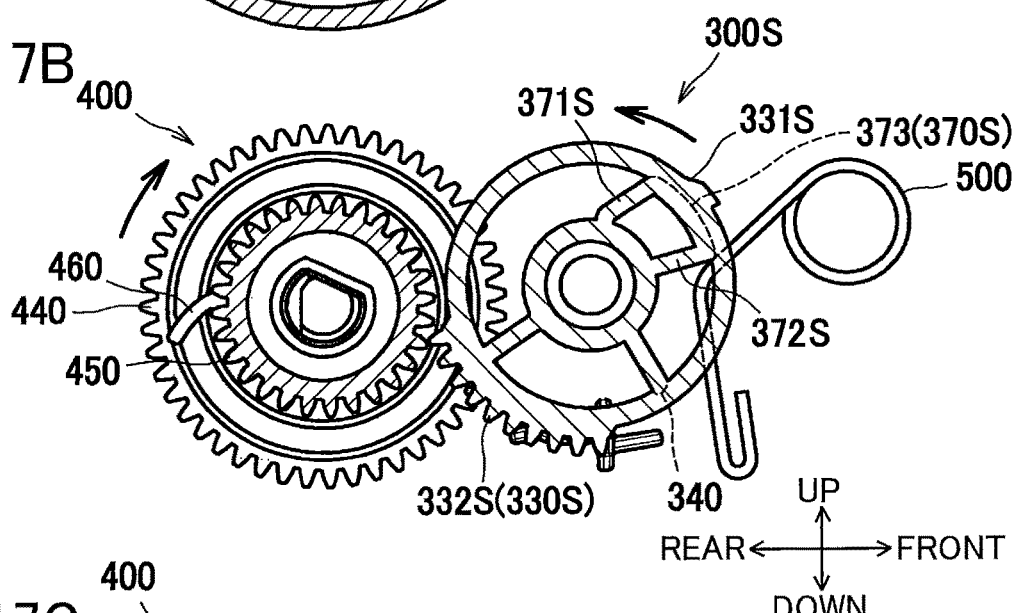
Figure 17C:
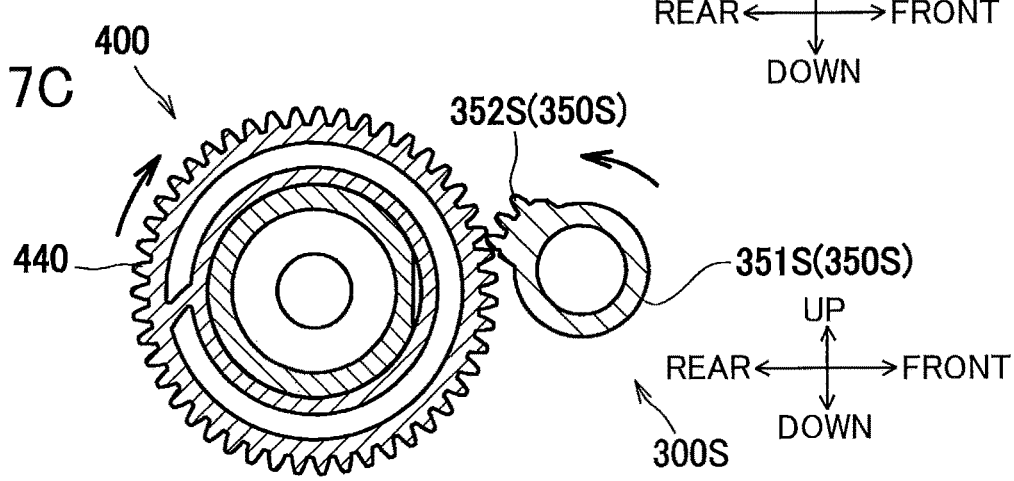

Thereafter, as shown in FIGS. 17B to 17C, the large-diameter gear portion 440 of the transmission gear 400 becomes meshed with the second gear portion 352S of the detection gear 300S after the small-diameter gear portion 450 is disengaged from the first gear portion 332S, thereby further rotating the detection gear 300S by a prescribed amount. The position of the detection gear 300S shown in FIG. 17B is an example of a third position. When the detection gear 300S is positioned at a prescribed position between the second position and the third position, the torsion spring 500 is in contact with the fourth rib 372S of the spring-engaging portion 370S and the torsion spring 500 urges the fourth rib 372S in the rotation direction. Specifically, during a period from the upstream end of the first gear portion 33S2 in the rotation direction reaches the small-diameter gear portion 450 until the downstream end of the second gear portion 352S in the rotation direction becomes engaged with the large-diameter gear portion 440, the torsion spring 500 urges the detection gear 300S in the rotation direction. In this way, the second gear portion 352S of the detection gear 300S is pressed toward the large-diameter gear portion 440 by the urging force of the torsion spring 500 after the first gear portion 332S is disengaged from the small-diameter gear portion 450. Accordingly, the second gear portion 352S and the large-diameter gear portion 440 can be reliably meshed with each other.

More specifically, the spring-engaging portion 370S presses the other end of the torsion spring 500 rightward in the drawings (i.e., frontward) while the detection gear 300S rotates from the position shown in FIG. 15B to the position shown in FIG. 16B. When the detection gear 300S reaches the position shown in FIG. 16B, the torsion spring 500 is in contact with a corner portion of the spring-engaging portion 370S at the upstream side in the rotation direction. The direction in which the torsion spring 500 applies the urging force to the spring-engaging portion 370S is thereby changed. Hence, the detection gear 300S is urged counterclockwise (i.e., rotation direction) by the torsion spring 500.

Figure 18A:
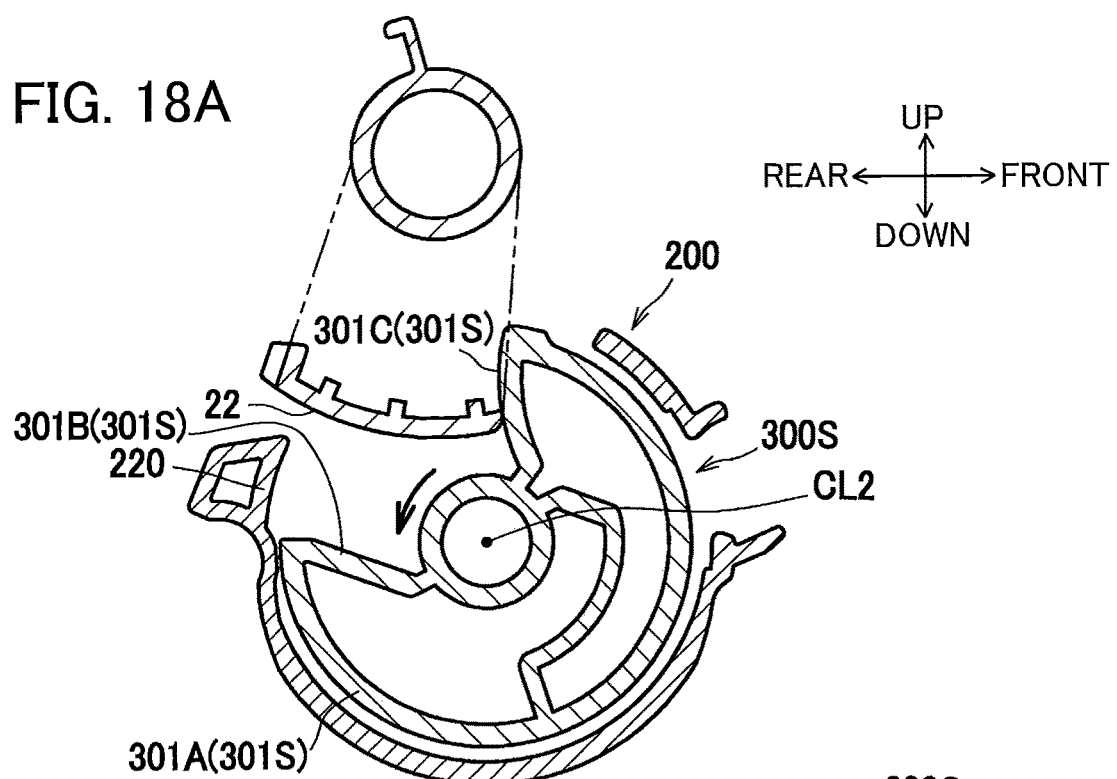
FIGS. 18A through 18C are cross-sectional views illustrating states of various components when a second gear portion of the standard-type detection gear is intermeshed with a large-diameter gear portion of the transmission gear.
Figure 18B:
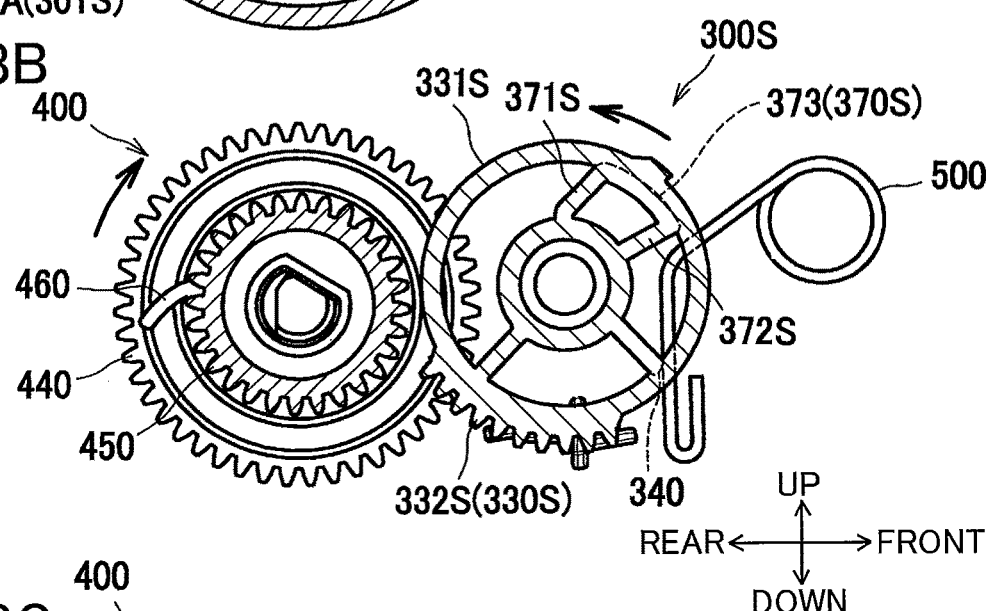
Figure 18C:
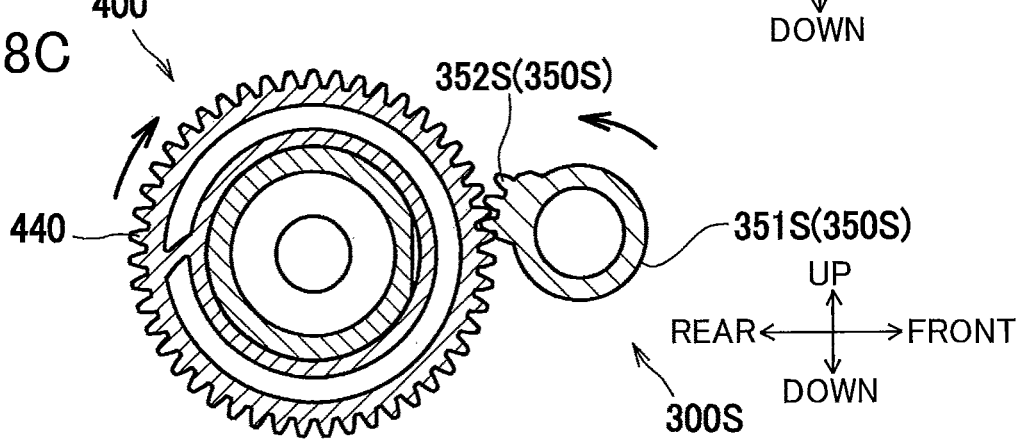

Thereafter, as shown in FIGS. 18A to 18C, the detection gear 300S keeps rotating while the second gear portion 352S meshes with the large-diameter gear portion 440. When the second gear portion 352S releases from meshing with the large-diameter gear portion 440 as shown in FIG. 19C, the detection gear 300S stops at its final position shown in FIGS. 19A to 19C. At this time, the torsion spring 500 is in contact with the second rib 340 of the detection gear 300S at its upstream end in the rotation direction to urge the detection gear 300S downstream in the rotation direction. Accordingly, the second protrusion 382 of the detection gear 300S is pressed toward the movement restricting portion 210 as shown in FIG. 10B, thereby the detection gear 300S being held at its final position. The final position is an example of a fourth position. In the final position (fourth position), the second gear portion 352S is positioned outside the rotational locus of the large-diameter gear portion 440.

In this embodiment, as shown in FIGS. 17A to 17C, the second gear portion 352S can mesh with the large-diameter gear portion 440 before the second extension wall 301C of the detection protrusion 301S is in contact with an actuator 22. With this configuration, because the detection protrusion 301S can strongly press the actuator 22 upon receipt of the drive force which is inputted into the detection gear 300S from the transmission gear 400, due to meshing engagement between the gear teeth, the actuator 22 can reliably operate.

Note that the above-described operations are also configured to be performed in a similar manner in the high-capacity-type detection gear 300H, as shown in FIGS. 20A to 25C. However, the torsion spring 500 operates somewhat differently, as will be described below.

Figure 20A:
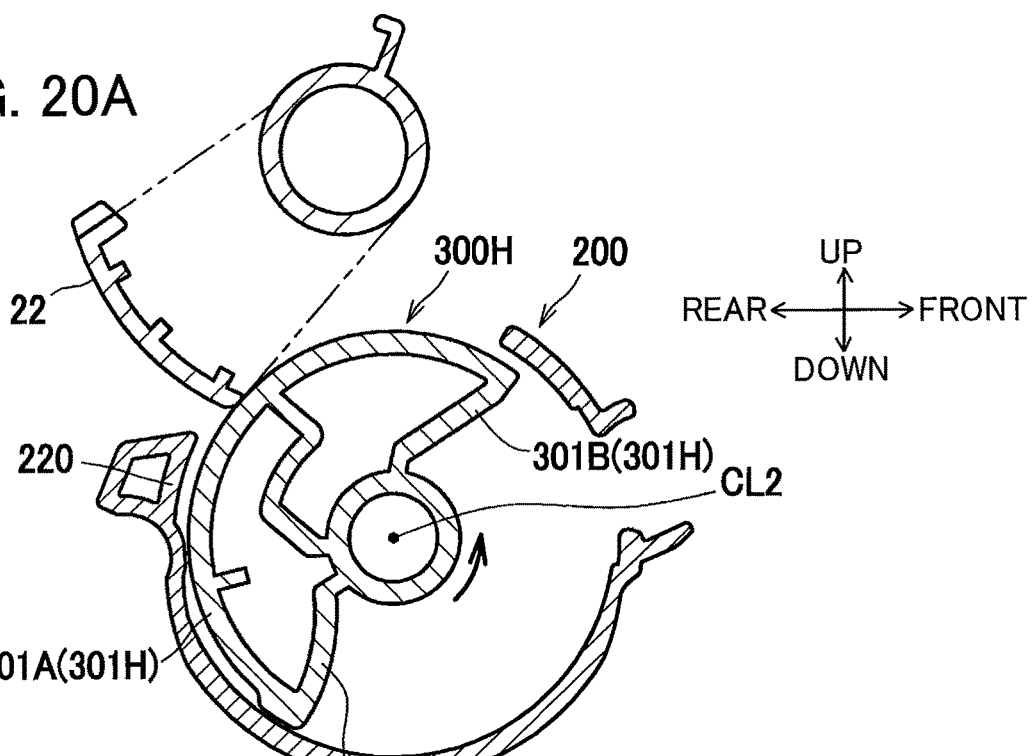
FIGS. 20A through 20C are cross-sectional views illustrating states of various components when the high-capacity-type detection gear is at the initial position.
Figure 20B:
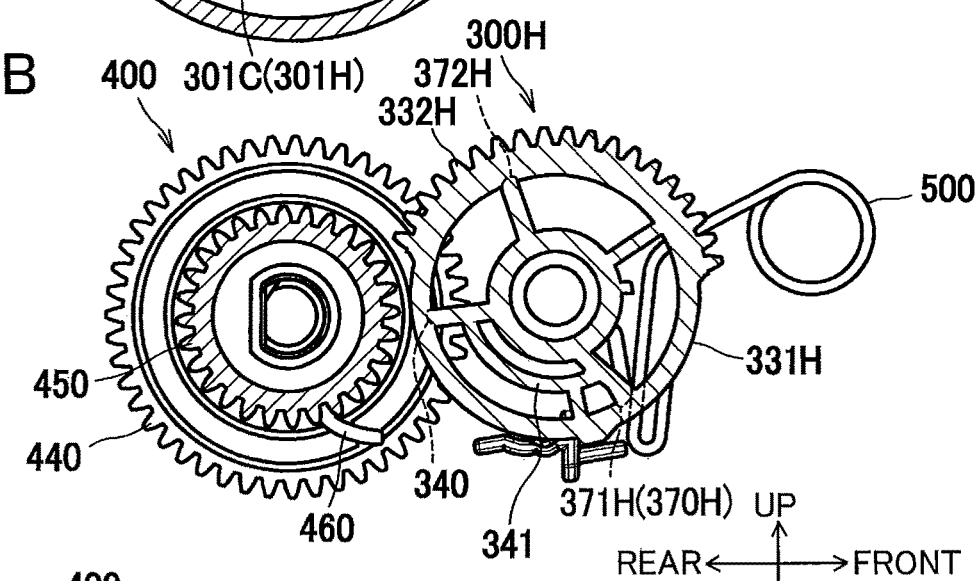
Figure 20C:
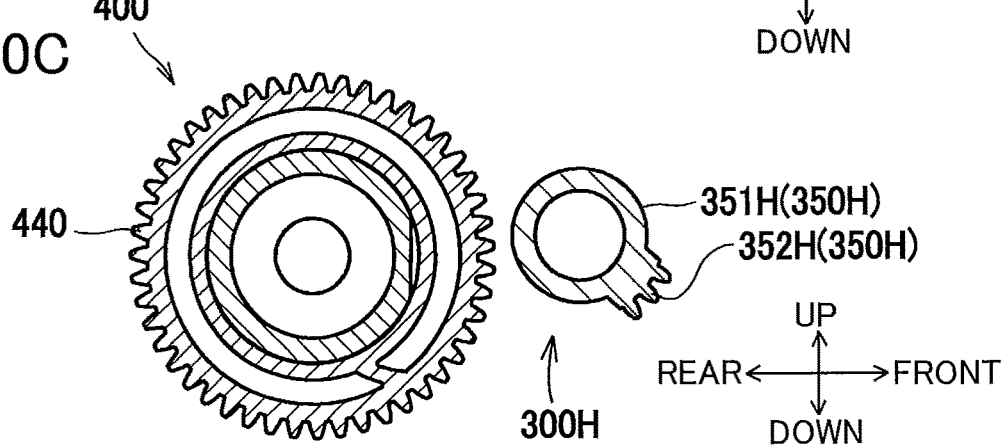
Figure 21A:
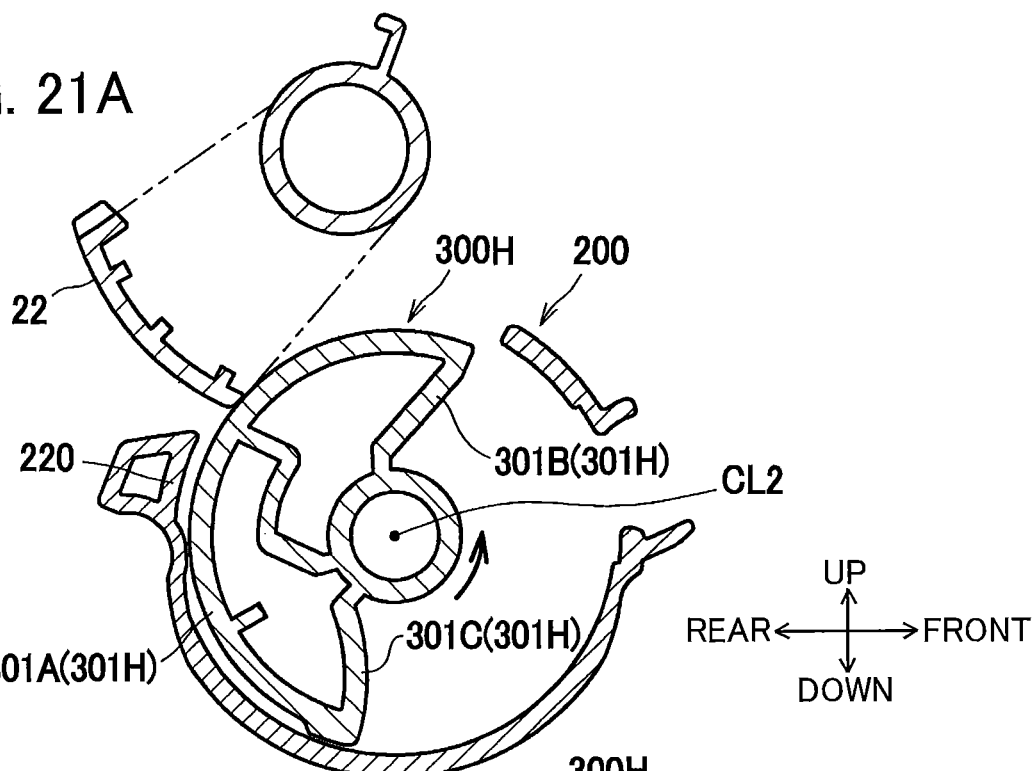
FIGS. 21A through 21C are cross-sectional views illustrating states of various components when the first gear portion of the high-capacity-type detection gear is intermeshed with the small-diameter gear portion of the transmission gear.
Figure 21B:
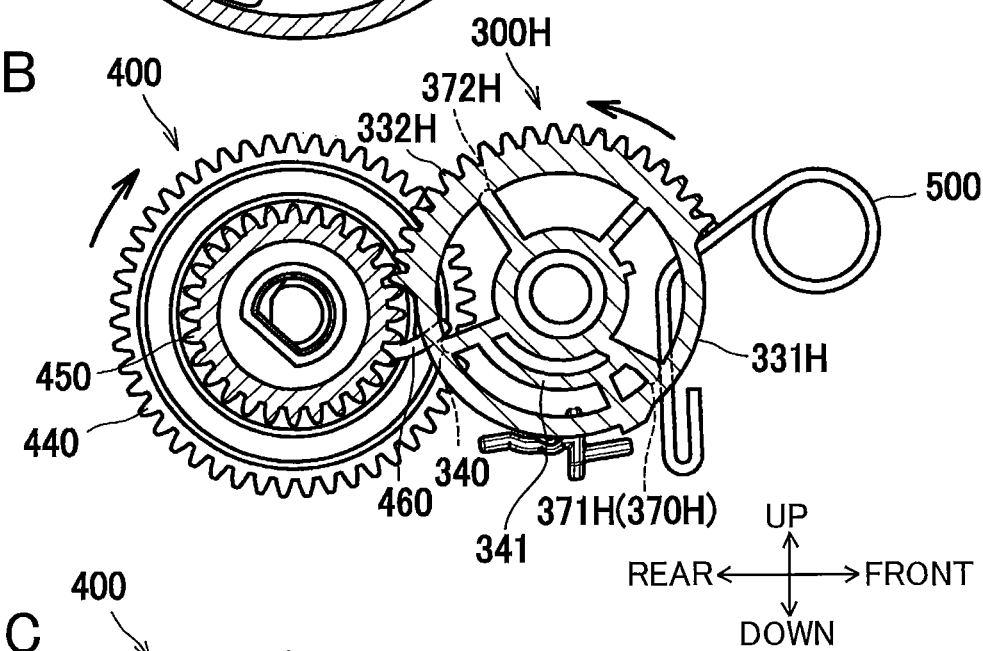
Figure 21C:
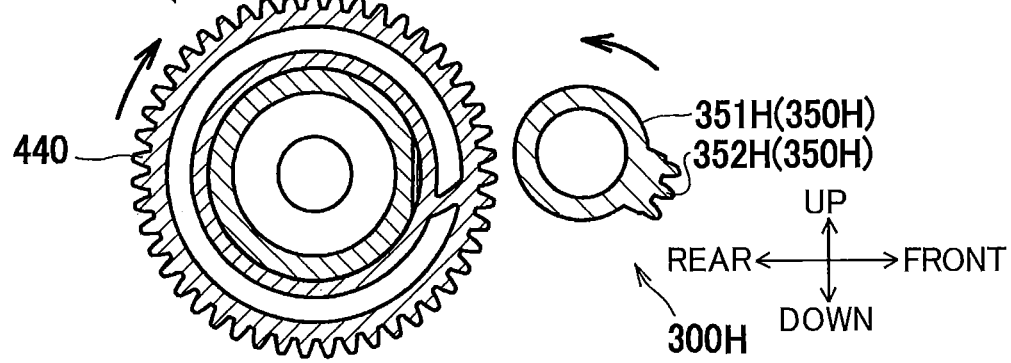

As shown in FIG. 20B, when the high-capacity-type detection gear 300H is in its initial position, i.e., in the first position, the torsion spring 500 engages the third rib 371H to urge the third rib 371H counterclockwise. Thereafter, as the detection gear 300H starts rotating clockwise as shown in FIG. 21B, the third rib 371H presses the torsion spring 500 rightward in the drawing against the urging force of the torsion spring 500.

Figure 22A:
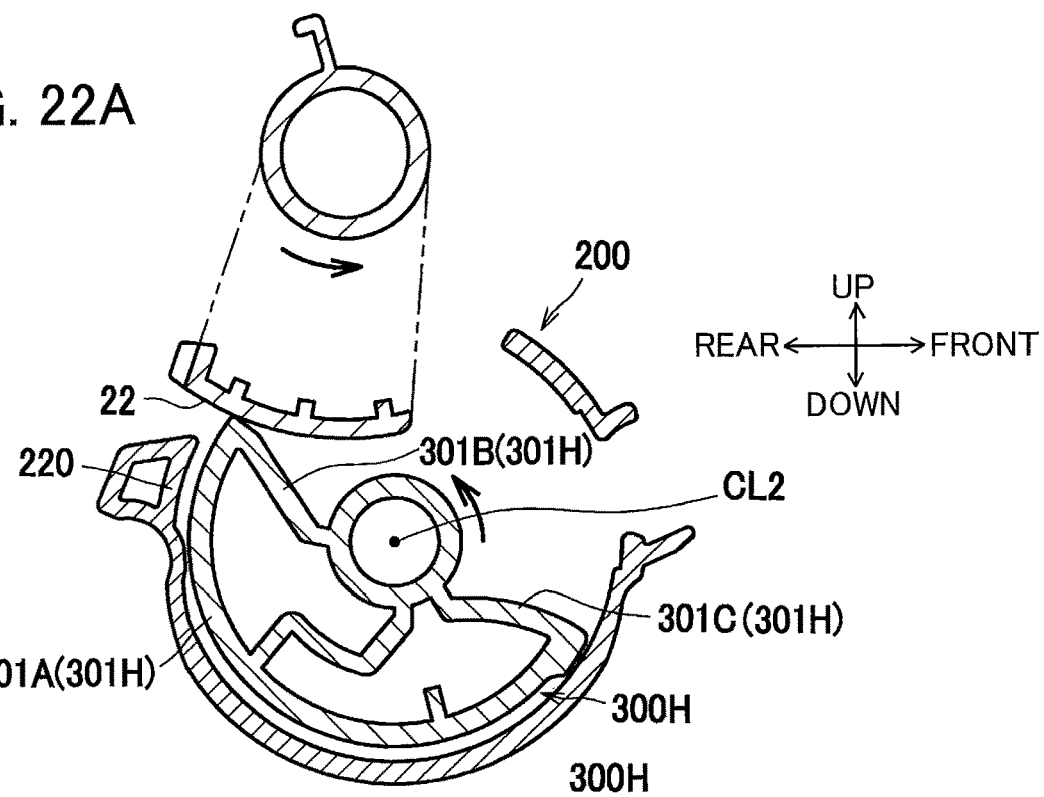
FIGS. 22A through 22C are cross-sectional views illustrating states of various components when the actuator is separated from the outer peripheral surface of the detection protrusion of the high-capacity-type detection gear.
Figure 22B:
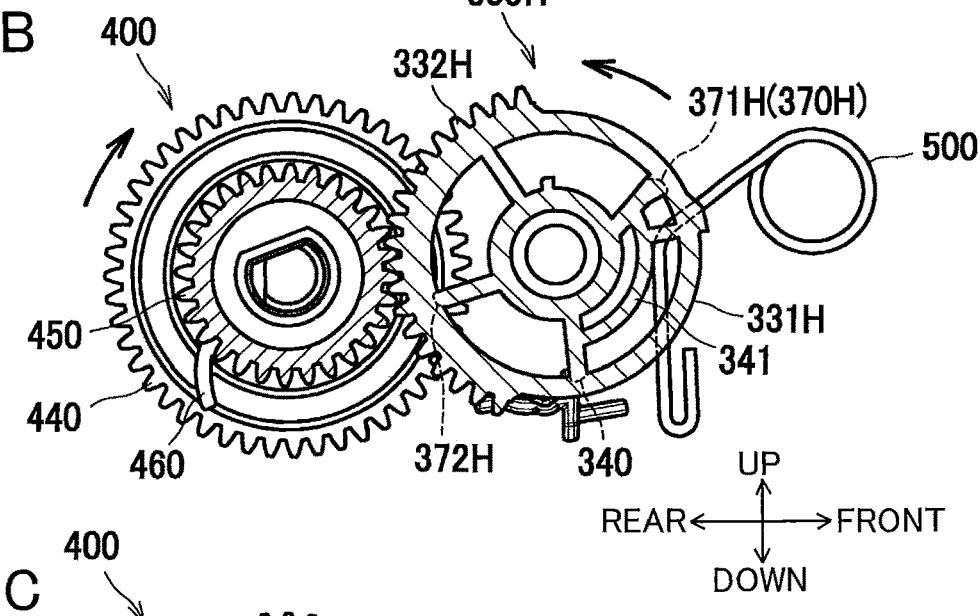
Figure 22C:
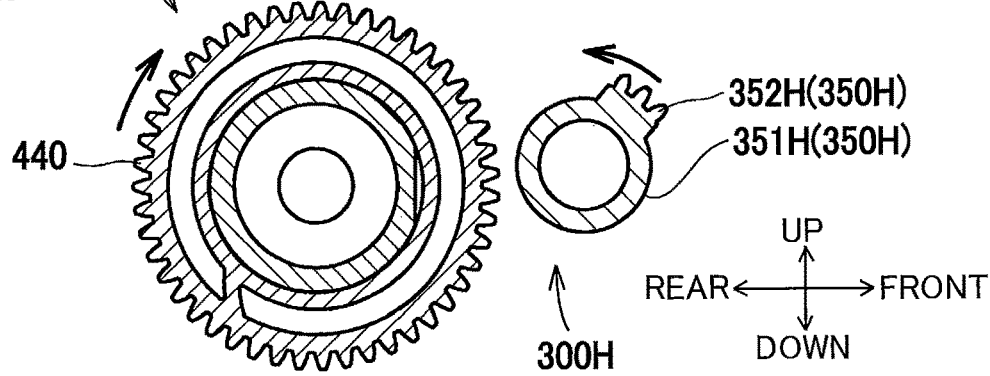
Figure 23A:
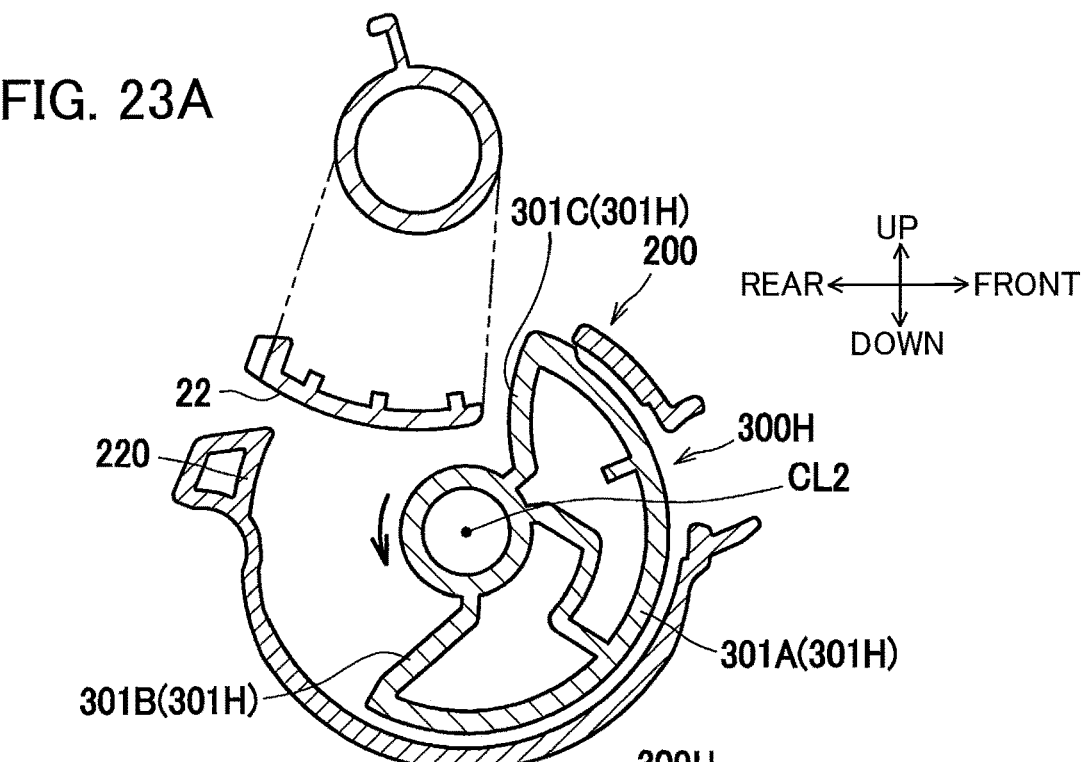
FIGS. 23A through 23C are cross-sectional views illustrating states of various components when the first gear portion of the high-capacity-type detection gear is separated from the small-diameter gear portion of the transmission gear.
Figure 23B:
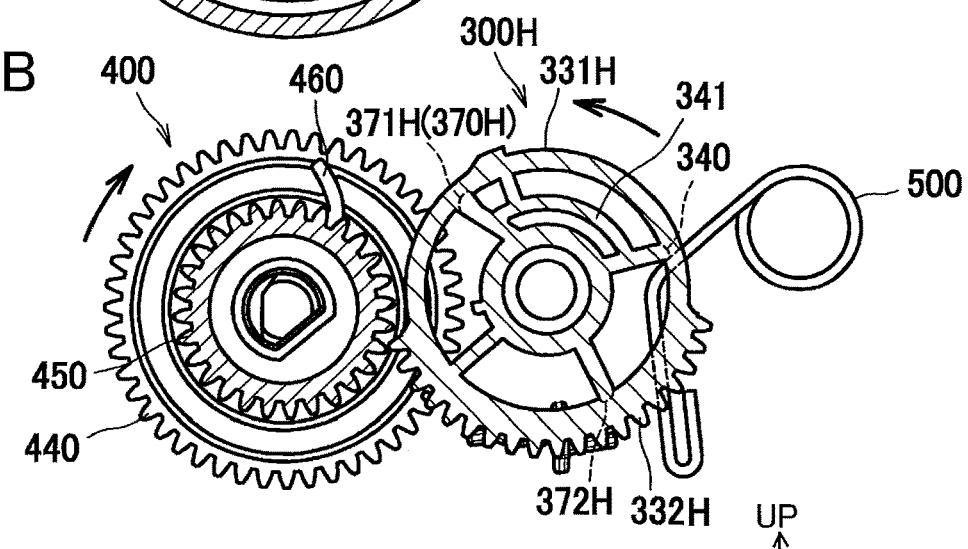
Figure 23C:
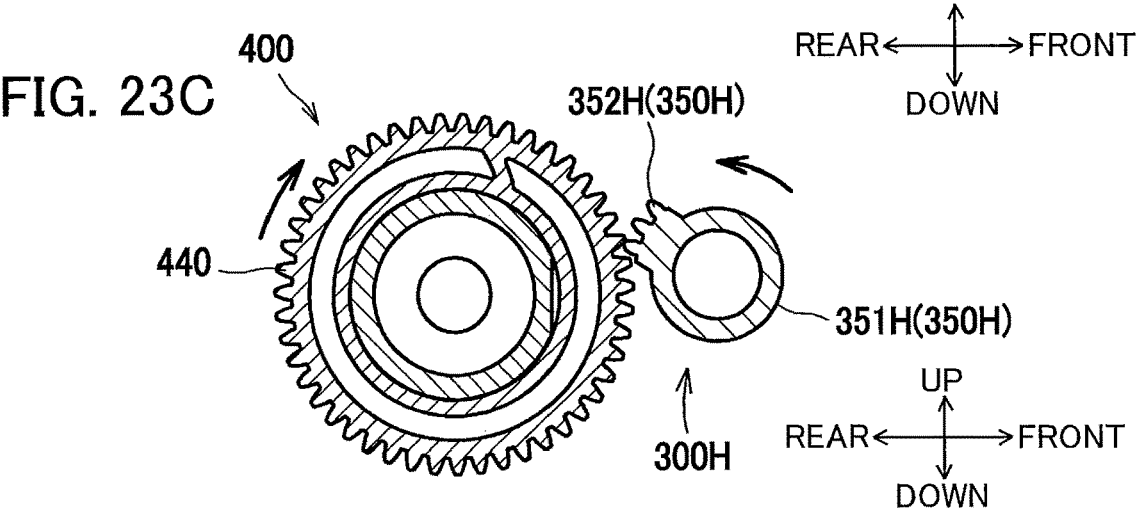

Subsequently, as shown in FIG. 22B, when the third rib 371H disengages from the torsion spring 500, the torsion spring 500 is then supported by an outer circumferential surface of the arcuate wall 341 connecting the third rib 371 and the second rib 340. The urging force of the torsion spring 500 is therefore directed toward the center of the detection gear 300H. Then, as shown in FIG. 23B, at a timing when the meshing state of the transmission gear 400 with the detection gear 300H changes from meshing between the transmission gear 400 and the first gear portion 332H to meshing between the transmission gear 400 and the second gear portion 352H, the torsion spring 500 comes into mesh with the second rib 340 from upstream thereof in the rotation direction. As a result, because the torsion spring 500 urges the second rib 340 toward downstream in the rotation direction, the urging force of the torsion spring 500 assists movement of the second gear portion 352H to reliably bring the second gear portion 352H into mesh with the large-diameter gear portion 440.

Figure 24A:
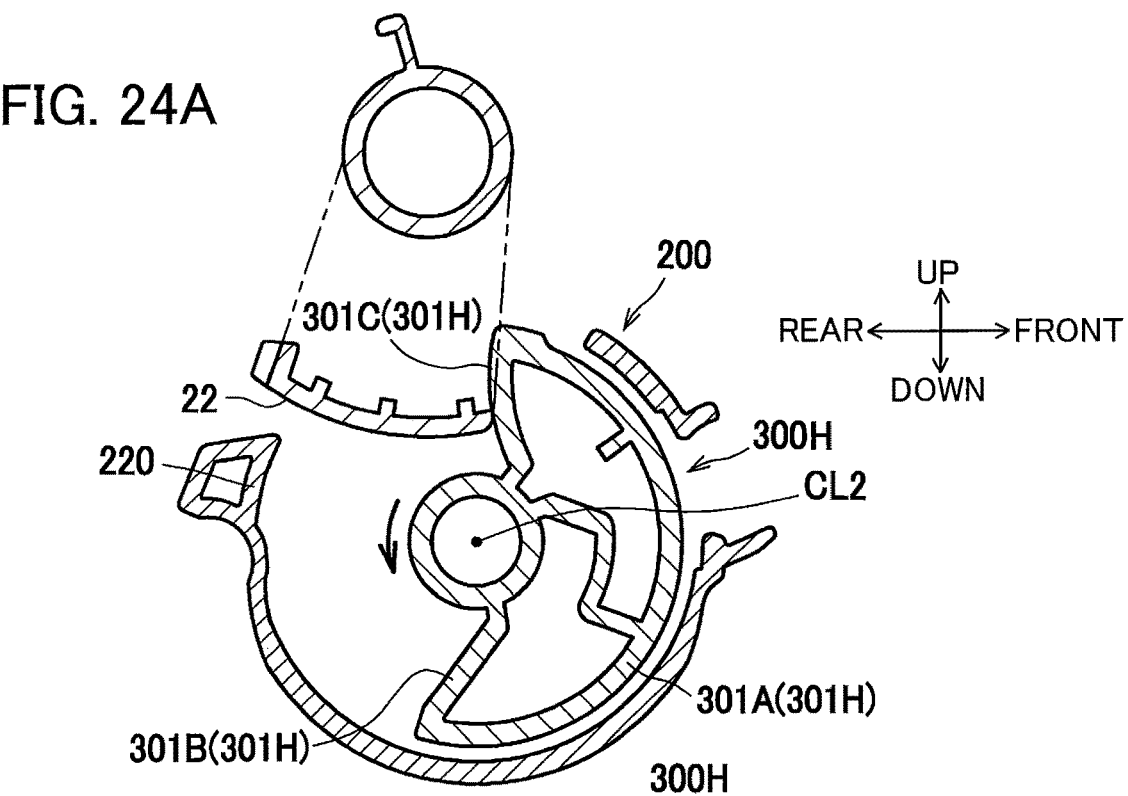
FIGS. 24A through 24C are cross-sectional views illustrating states of various components when the second gear portion of the high-capacity-type detection gear is intermeshed with the large-diameter gear portion of the transmission gear.
Figure 24B:
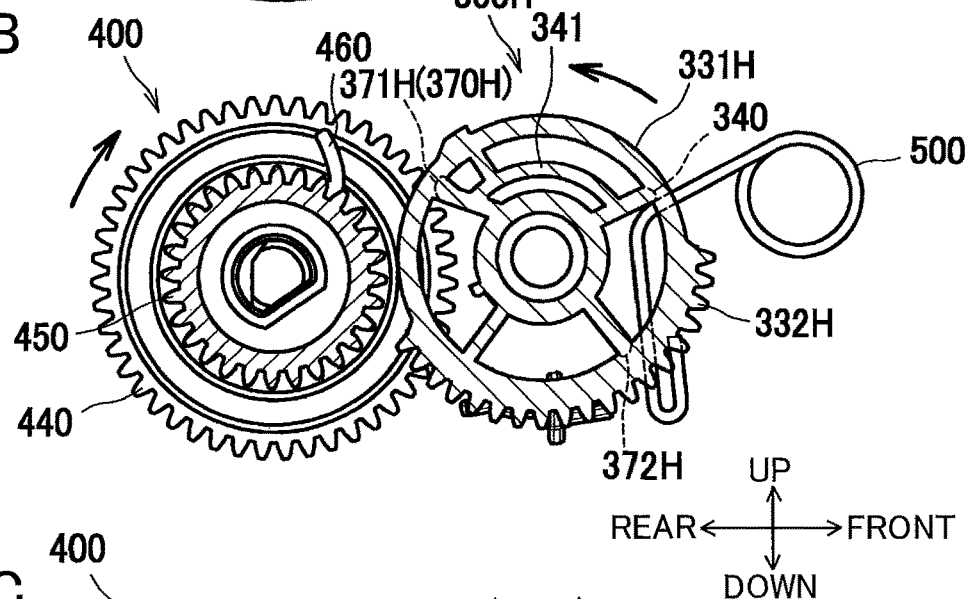
Figure 24C:
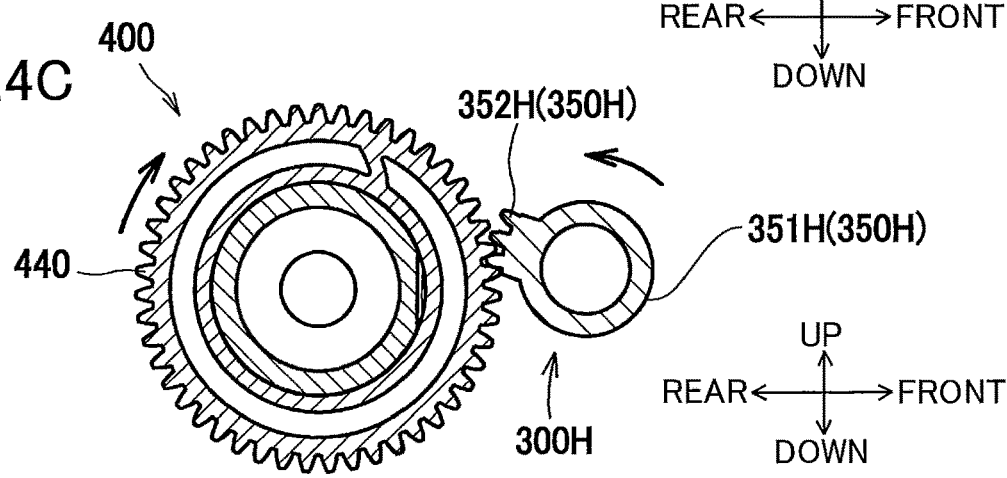

Thereafter, as shown in FIGS. 24B and 25B, the torsion spring 500 is in contact with an upstream surface of the fourth rib 372H in the rotation direction to urge the detection gear 300H toward downstream in the rotation direction, after the torsion spring 500 is deformed frontward by the fourth rib 372 of the detection gear 300. Accordingly, as shown in FIG. 13B, the first protrusion 381 of the detection gear 300H is pressed toward the movement restricting portion 210 so that the detection gear 300H is held in the final position.

The detection protrusion 301(301S, 301H) is used to enable a control device (not shown) to determine whether the developing cartridge 8(8S, 8H) is a new cartridge and/or to identify specifications of the developing cartridge 8(8S, 8H). Hereinafter, new product determination and/or specification identification according to the embodiment will be briefly described.

When the developing cartridge 8(8S, 8H) is a new cartridge, the detection protrusion 301(301S, 301H) is in its initial position as an example of the first position shown in FIG. 14A. When this developing cartridge 8(8S, 8S) (new cartridge) is attached to the image-forming apparatus, the outer peripheral wall 301A of the detection protrusion 301(301S, 301H) can be in contact with the actuator 22 that is pivotably provided in the main body of the image-forming apparatus. That is, the detection protrusion 301(301S, 301H) includes a first portion 301D that is in contact with the actuator 22 provided in the main body of the image-forming apparatus when the detection gear 300 is at the initial position (first position). As shown in FIG. 3A, when the outer peripheral wall 301A of the detection protrusion 301(301S, 301H) abuts on the actuator 22, the actuator 22 is pivoted rearward. As an optical sensor (not shown) detects this pivoting of the actuator 22, the control device (not shown) can determine that the developing cartridge 8(8S, 8H) is attached to the main body of the image-forming apparatus.

Incidentally, the rearward pivoting of the actuator 22 may be detected either by: detecting that the optical sensor detects an ON signal as a result of the rearward pivoting and displacement of the actuator 22 that was positioned between a light-emitting element and a light-receiving element; or by detecting that the optical sensor detects an OFF signal as a result of shutting off of light attributed to the rearward pivoting of the actuator 22. In the following description, detection of the rearward pivoting of the actuator 22 is assumed to be performed by detecting that the optical sensor detects the ON signal.

Thereafter, an image-forming operation is initiated by the image-forming apparatus and the drive force is inputted into the developing cartridge 8(8S, 8H), as shown in FIGS. 15A and 20A, the detection protrusion 301S is pivoted counter-clockwise in the drawing. As the detection protrusion 301 (301S, 301H) rotates and the outer peripheral wall 301A of the detection protrusion 301(301S, 301H) disengages from the actuator 22, as shown in FIGS. 16A and 22A, the actuator 22 is urged, by an urging force of a spring (not shown) that urges the actuator 22 toward its normal position (the position indicated by phantom lines in FIG. 3A), to move into a space between the first extension wall 301B and second extension wall 301C and the actuator 22 returns to the normal position. The optical sensor thus detects the OFF signal.

Figure 19A:
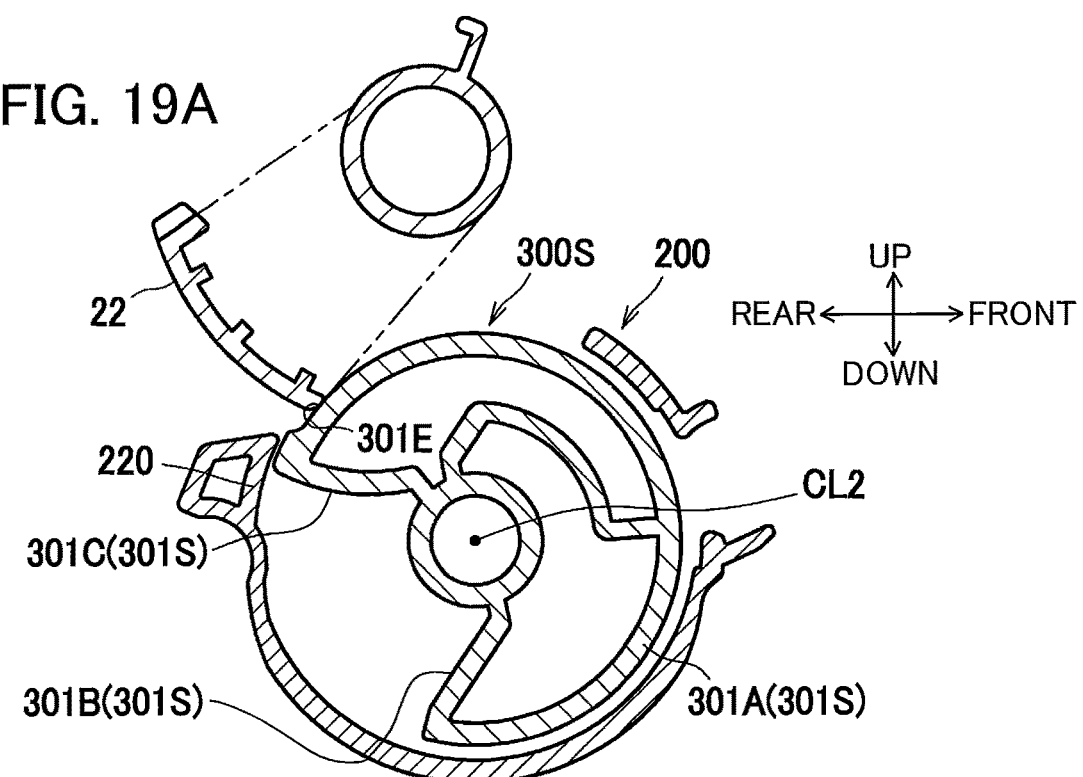
FIGS. 19A through 19C are cross-sectional views illustrating states of various components when the standard-type detection gear is at a final position.
Figure 19B:
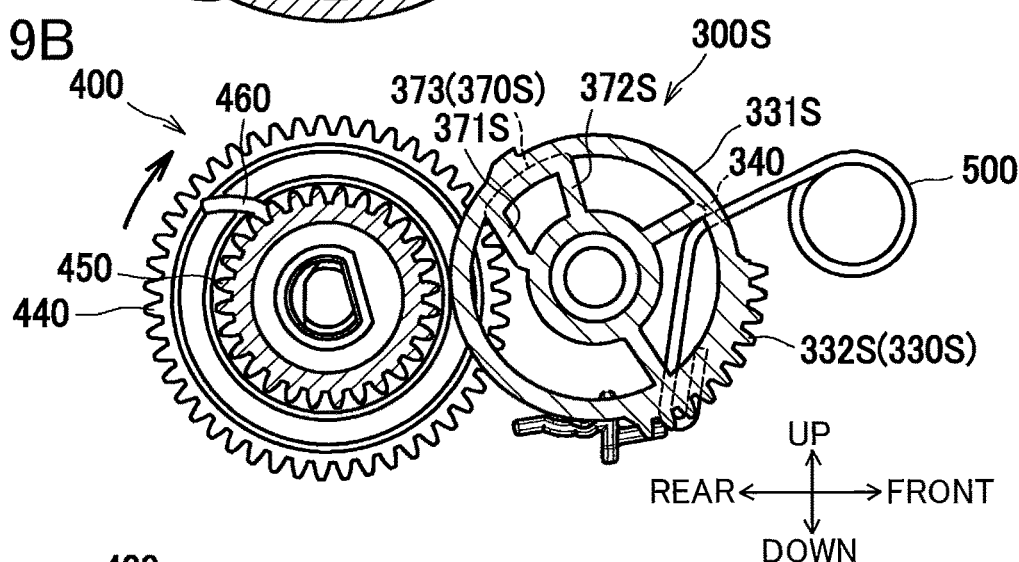
Figure 19C:
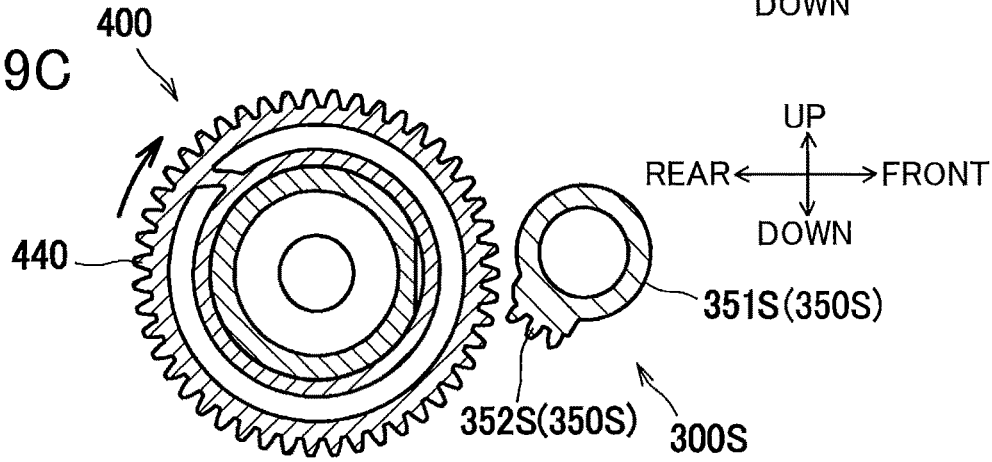

Subsequently, after the actuator 22 is pushed rearward by the second extension wall 301C of the detection protrusion 301(301S, 301H) as shown in FIGS. 18A and 24A, the actuator 22 is supported again by the outer peripheral wall 301A as shown in FIGS. 19A and 25A. The optical sensor therefore once again detects the ON signal. In other words, the detection protrusion 301(301S, 301H) includes a second portion 301E that is in contact with the actuator 22 provided in the main body of the image-forming apparatus when the detection gear 300(300S, 300H) is at the final position (fourth position). Thus, when a signal from the optical sensor changes from the ON signal to the OFF signal and then to the ON signal after the drive force is inputted into the developing cartridge 8(8S, 8H), the control device determines that the attached standard-type developing cartridge 8(8S, 8H) is a new cartridge.

Further, when the detection protrusion 301(301S, 301H) moves to the final position as an example of the fourth position where the outer peripheral wall 301A once again supports the actuator 22, the detection gear 300(300S, 300H) is disengaged from the gear disposed upstream of the detection gear 300(300S, 300H) (namely, from the gear disposed upstream in a direction of transmission of the drive force). The detection protrusion 301(301S, 301H) is thereby maintained at the final position. Accordingly, when a developing cartridge 8(8S, 8H) that has been used once is attached to the main body of the image-forming device, the outer circumferential surface 301A of the detection protrusion 301(301S, 301H) in its final position presses the actuator 22 rearward, thereby the optical sensor detecting the ON signal. Even when an image-forming operation is initiated thereafter and the drive force is inputted into the developing cartridge 8(8S, 8H), the detection protrusion 301(301A, 301H) does not move out of the final position and therefore the signal of the optical sensor after the input of the drive force into the developing cartridge 8(8S, 8H) keeps the ON signal. In this case, the control device determines that the mounted standard-type developing cartridge 8(8S, 8H) is old (used once or more).

Further, the gap (angle) from the first extension wall 301B of the detection protrusion 301(301S, 301H) to the second extension wall 301C in the rotation direction is determined according to the specification of the developing cartridge 8(8S, 8H). Therefore, when the optical sensor detects the OFF signal for a first time duration, the control device can determine that the mounted developing cartridge 8 is a standard-type cartridge 8S that can accommodate a standard amount of toner in the cartridge body 100. Alternatively, when the optical sensor detects the OFF signal for a second time duration that is longer than the first time duration, the control device determines that the mounted developing cartridge 8 is the high-capacity-type developing cartridge 8H that can accommodate a greater amount of toner than the standard-type developing cartridge 8S.

Specifically, in case of the standard-type developing cartridge 8S shown in FIG. 4A, the gap between the first extension wall 301B and the second extension wall 301C of the detection protrusion 301S is a prescribed first distance. In other words, referring to FIG. 4A, the angle between the line segment L1 connecting the first end portion A1 of the outer peripheral wall 301A of the detection protrusion 301S and the second axis CL2 and the line segment L2 connecting the second end portion A2 of the outer peripheral wall 301A of the detection protrusion 301S and the second axis CL2 is a first angle θ1. This first angle θ1 for the detection gear 300S may be set, for example, in a range from 97° to 99°. In this embodiment, the first angle θ1 is 98°.

In contrast, in case of the high-capacity-type developing cartridge 8H shown in FIG. 5A, the gap between the first extension wall 301B and second extension wall 301C of the detection protrusion 301H is a second distance that is larger than the first distance. In other words, referring to FIG. 5A, the angle between the line segment L1 and the line segment L2 for the detection gear 300H is a second angle θ2 that is larger than the first angle θ1.

The second angle θ2 for the detection gear 300H may be in a range, for example, from 188° to 190°. Note that, contrary to the present embodiment, the angle for the detection gear 300S may be set to the second angle θ2, while the angle for the detection gear 300H may be set to the first angle θ1. In this embodiment, the second angle θ2 is 189°.

According to the above configuration, following technical advantages can be obtained.

The detection gear 300(300S, 300H) is rotatable while the small-diameter gear portion 450 meshes with the first gear portion 332(332S, 332H) and the large-diameter gear portion 440 meshes with the second gear portion 352(352S, 352H). With this structure, compared to a case where the detection gear 300 were not provided with the second gear portion 352, the detection gear 300(300S, 300H) of the present embodiment can rotate a larger amount, which makes the detection protrusion 301(301S, 301H) move a larger amount to realize more reliable new product detection process and/or specification detection process. Note that a rotation speed of the detection gear 300(300S, 300H) can change at a timing that the meshing between the small-diameter gear portion 450 and the first gear portion 332 (332S, 332H) is swished to the meshing between the large-diameter gear portion 440 and the second gear portion 352(352S, 352H). This change in speed may be utilized to perform the new product detection process and/or specification detection process.

The second gear portion 352(352S, 352H) meshes with the large-diameter gear portion 440 before the second extension wall 301C of the detection protrusion 301(301S, 301H) is in contact with the actuator 22. With this structure, the detection gear 300(300S, 300H) can be suppressed from rotating in a reverse direction by the urging force of the actuator 22 after the first gear portion 332(332S, 332H) becomes unmeshed with the small-diameter gear portion 450.

The torsion spring 500 urges the detection gear 300(300S, 300H) downstream in the rotation direction until the downstream end of the second gear portion 352(352S, 352H) in the rotation direction meshes with the large-diameter gear portion 440 after the upstream end of the first gear portion 332(332S, 332H) in the rotation direction reaches the small-diameter gear portion 450. Hence, after the first gear portion 332(332S, 332H) becomes unmeshed with the small-diameter gear portion 450, the urging force of the torsion spring 500 can reliably bring the second gear portion 352(352S, 352H) into mesh with the large-diameter gear portion 440.

Because the torsion spring 500 urges the first restriction portion 360 of the detection gear 300(300S, 300H) toward the restricting portion 152, the detection gear 300 can be held reliably at the initial position.

The torsion spring 500 engages with the spring-engaging portion 370(370S, 370H) that is positioned between the first gear portion 332(332S, 332H) and the second gear portion 352(352S, 352H) in the axial direction. This structure can suppress the detection gear 300(300S, 300H) from being inclined due to the urging force of the torsion spring 500 and therefore prevent the first gear portion 332(332S, 332H) and/or the second gear portion 352(352S, 352H) from coming out of mesh.

At the final position, the second extension wall 301C of the detection protrusion 301(301S, 301H) is positioned downstream relative to the upstream end of the arc-shaped wall 220 of the first gear cover 200 in the rotation direction (see FIGS. 19A and 25A). This structure can prevent a gap from being formed between the second extension wall 301C of the detection protrusion 301(301S, 301H) and the upstream end of the arc-shaped wall 220 in the rotation direction at the final position. Accordingly, with this structure, the actuator 22 in contact with the detection protrusion 301(301S, 301H) can be suppressed from getting stuck in the gap.

The present disclosure is not limited to the depicted embodiment, but many modifications and variations may be made therein as described below.

In the depicted embodiment, the present disclosure is applied to the laser printer 1. However, this disclosure is not limited to the laser printer, but may be applied to an image-forming apparatus of any other type, such as a copier and a multifunction device.

In the depicted embodiment, the present disclosure is applied to the developing cartridge 8, but the present disclosure is not limited thereto. For example, if a developing device including a developing roller is provided separately from a toner cartridge having a toner-accommodating section, the present disclosure may be applied to the toner cartridge.

Figure 27:
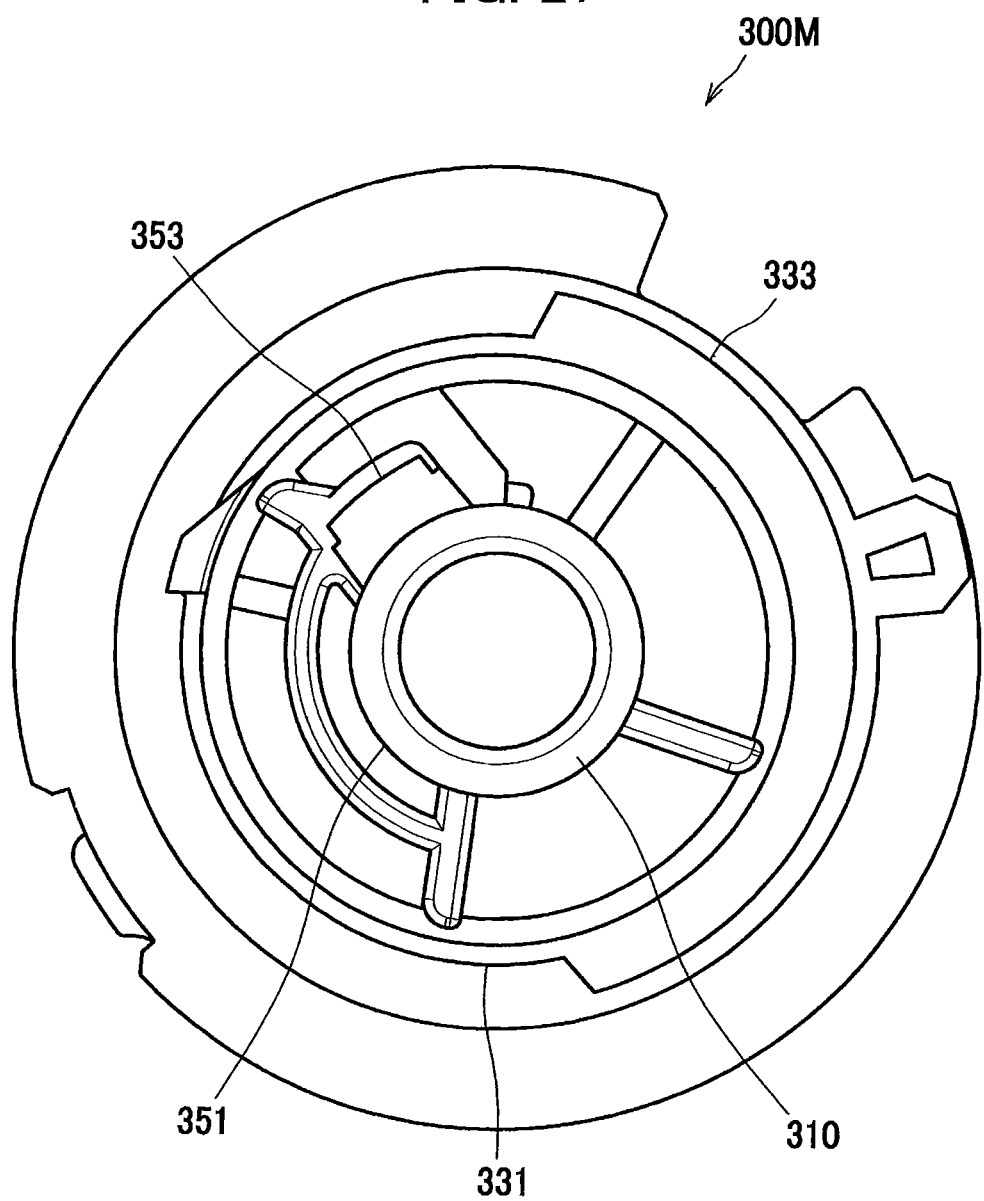
FIG. 27 is a view illustrating a detection gear according to a variation of the embodiment.

In the embodiment described above, the drive force is transmitted through the gear teeth from the transmission gear 400 to the detection gear 300(300S, 300H). The present disclosure is not limited to this configuration, however, but a friction member, such as a rubber or a sponge, may be used in place of the gear teeth. For example, as shown in FIG. 27, in place of the first gear portion 332, a first friction member 333 may be provided along a portion of the first toothless portion 331 so as to be frictionally engageable with the small-diameter gear portion 450; and in place of the second gear portion 352, a second friction member 353 may be provided along a portion of the second toothless portion 351 so as to be frictionally engageable with the large-diameter gear portion 440. Similarly, the gear teeth of the transmission gear may be replaced by a friction member.

In the embodiment described above, the detection protrusion 301(301S, 301H) is formed integral with the detection gear 300(300S, 300H), but the present disclosure is not limited to this configuration. For example, the detection protrusion may be a separate member from the detection gear, and may be a resin film or a plate-shaped rubber.

In the embodiment described above, the detection protrusion 301(301S, 301H) has an arcuate shape. However, the present disclosure is not limited to this configuration. For example, the detection protrusion may be configured of two separate detection protrusions provided to be spaced apart from each other in the rotation direction.

In the embodiment described above, the cap 150 supports the detection gear 300(300S, 300H). However, the present disclosure is not limited to this configuration. Instead, for example, the detection gear 300 may be supported by a component that is provided separately from the cartridge body 100 and that is other than the cap 150. In this case, a fill hole may be may be formed in a side wall of the cartridge body 100 opposite to a side wall at which a gear train including the detection gear 300(300S, 300H) is arranged.

In the embodiment described above, the boss 155 supporting the detection gear 300(300S, 300H) protrudes from the cap 150. However, this disclosure is not limited to this configuration. For example, the boss 155 may be formed integral with the cartridge body 100.

In the embodiment described above, the torsion spring 500 is used as the spring. The present disclosure is not limited to this configuration, but the spring may be, for example, a coil spring, a leaf spring or a resin member having resiliency.

In the embodiment described above, the cylindrical portion 380 and the rotational shaft portion 310 are hollow members. However, the disclosure is not limited to this configuration. Instead, the cylindrical portion and the rotational shaft portion may be solid members. A portion of the rotational shaft portion 310 that corresponds to the second toothless portion 351 may be partially cut out. Further, a portion on the surface of the cylindrical portion 380 that corresponds to the first toothless portion 331 may be cut out. That is, the cylindrical portion 380 may have an arcuate shape.

While the detection gear 300(300S, 300H) is configured to mesh with the transmission gear 400 supported by the agitator 85, the detection gear 300(300S, 300H) may be so configured to mesh with the idle gear 140.

The second extension wall 301C may not be connected to the rotational shaft portion 310. Further, a plurality of bosses may be arranged in place of the second extension wall 301C to function as the second extension wall 301C.

While the disclosure is described in detail with reference to the specific embodiments thereof while referring to accompanying drawings, it would be apparent to those skilled in the art that many modifications and variations may be made therein without departing from the scope of the disclosure.

What is claimed is:

1. A developer cartridge comprising:
a first gear rotatable about a first axis extending in an axial direction, the first gear comprising:
a small-diameter gear portion; and
a large-diameter gear portion having a diameter larger than a diameter of the small-diameter gear portion; and
a second gear rotatable about a second axis extending in the axial direction, the second gear comprising:

a first engagement portion extending along a portion of a peripheral surface of the second gear, the first engagement portion being engageable with the small-diameter gear portion; and a second engagement portion extending along a portion of a peripheral surface of the second gear, the second engagement portion being engageable with the large-diameter gear portion, and the second engagement portion being closer to the second axis than the first engagement portion is to the second axis in a radial direction of the second gear, the second engagement portion being configured to engage the large-diameter gear portion after the first engagement portion is engaged with the small-diameter gear portion.

2. The developer cartridge according to claim 1,
wherein the first engagement portion is a plurality of gear teeth, and
wherein the plurality of gear teeth is engageable with the small-diameter gear portion.

3. The developer cartridge according to claim 1,
wherein the second engagement portion is a plurality of gear teeth, and
wherein the plurality of gear teeth is engageable with the large-diameter gear portion.

4. The developer cartridge according to claim 1, further comprising:
a housing configured to accommodate developer therein; and
an agitator configured to agitate the developer in the housing,
wherein the first gear is supported by a rotation shaft of the agitator.

5. The developer cartridge according to claim 1, wherein the small-diameter gear portion and the large-diameter gear portion are rotatable about the first axis.

6. The developer cartridge according to claim 1, further comprising a housing configured to accommodate developer therein, wherein a distance between an outer surface of the housing and the large-diameter gear portion in the axial direction is smaller than a distance between the outer surface of the housing and the small-diameter gear portion in the axial direction.

7. The developer cartridge according to claim 1, further comprising a spring configured to contact the second gear to urge the second gear in a rotation direction of the second gear until the second engagement portion becomes engaged with the large-diameter gear portion after the first engagement portion is engaged with the small-diameter gear portion.

8. The developer cartridge according to claim 7, wherein the spring is configured to contact the second gear between the first engagement portion and the second engagement portion in the axial direction.

9. The developer cartridge according to claim 8, wherein the spring is a torsion coil spring.

10. The developer cartridge according to claim 1, wherein the first engagement portion is a friction member.

11. The developer cartridge according to claim 10, wherein the friction member is a rubber.

12. The developer cartridge according to claim 1, wherein the second engagement portion is a friction member.

13. The developer cartridge according to claim 12, wherein the friction member is a rubber.

14. The developer cartridge according to claim 1, further comprising a developing roller rotatable about a third axis extending in the axial direction.

15. The developer cartridge according to claim 1, further comprising a housing configured to accommodate developer therein,
wherein a distance between an outer surface of the housing and the second engagement portion in the axial direction is smaller than a distance between the outer surface of the housing and the first engagement portion in the axial direction.

* * * * *